(12) United States Patent
Germain

(10) Patent No.: US 12,193,434 B2
(45) Date of Patent: Jan. 14, 2025

(54) AGRICULTURAL TREATMENT CONTROL DEVICE

(71) Applicant: Carbon Bee, Châteauneuf sur Isère (FR)

(72) Inventor: Gérald Germain, Crepol (FR)

(73) Assignee: Carbon Bee, Châteauneuf sur Isère (FR)

( * ) Notice: Subject to any disclaimer, the term of this patent is extended or adjusted under 35 U.S.C. 154(b) by 414 days.

(21) Appl. No.: 17/437,333

(22) PCT Filed: Mar. 10, 2020

(86) PCT No.: PCT/EP2020/056401
§ 371 (c)(1),
(2) Date: Sep. 8, 2021

(87) PCT Pub. No.: WO2020/182840
PCT Pub. Date: Sep. 17, 2020

(65) Prior Publication Data
US 2022/0174934 A1    Jun. 9, 2022

(30) Foreign Application Priority Data

Mar. 12, 2019 (FR) ..................................... 1902497
Jul. 17, 2019 (FR) ..................................... 1908086

(51) Int. Cl.
*A01M 7/00* (2006.01)
*A01B 79/00* (2006.01)
(Continued)

(52) U.S. Cl.
CPC ......... *A01M 7/0089* (2013.01); *A01B 79/005* (2013.01); *A01M 21/043* (2013.01); *A01B 69/001* (2013.01)

(58) Field of Classification Search
CPC .... A01M 7/0089; A01B 69/001; G06V 20/56
See application file for complete search history.

(56) References Cited

U.S. PATENT DOCUMENTS 6,640,310 B2    10/2003   Jensen et al.
6,930,710 B1     8/2005   Classen et al.
(Continued)

FOREIGN PATENT DOCUMENTS

CN         108990944        12/2018
EP         3165089 A1        5/2017
(Continued)

OTHER PUBLICATIONS

Lloret, J.; Bosch, I.; Sendra, S.; Serrano, A. A Wireless Sensor Network for Vineyard Monitoring That Uses Image Processing. Sensors 2011, 11, 6165-6196. https://doi.org/10.3390/s110606165 (Year: 2011).*

(Continued)

*Primary Examiner* — Anne Marie Antonucci
*Assistant Examiner* — Jordan T Smith
(74) *Attorney, Agent, or Firm* — IP Attorneys Group, LLC

(57) ABSTRACT

The invention relates to a collaborative agricultural field processing control device intended to be mounted on an agricultural machine (1), composed of a set of detectors (2) for weeds or leaf symptoms of deficiencies or diseases collaborating in the decision to control the treatment devices (3) of the agricultural field.

18 Claims, 13 Drawing Sheets

Figure 1:
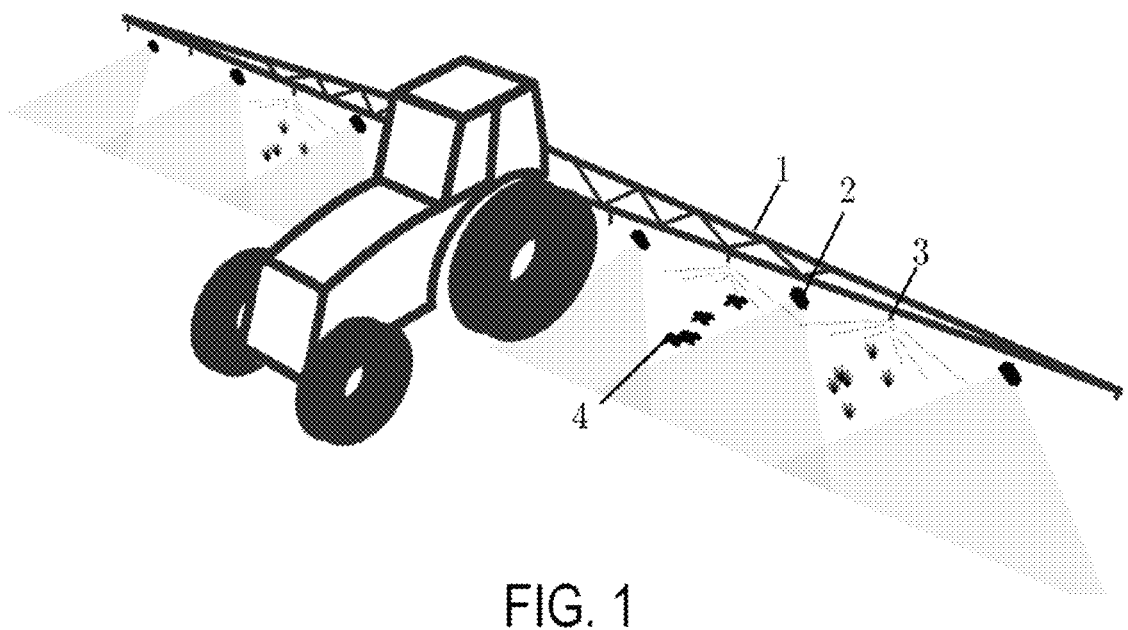

(51) Int. Cl.
*A01M 21/04* (2006.01)
*A01B 69/00* (2006.01)

(56) References Cited

U.S. PATENT DOCUMENTS

| | | | |
|---|---|---|---|
| 7,412,330 | B2 | 8/2008 | Spicer et al. |
| 8,139,924 | B2 | 3/2012 | Walters et al. |
| 10,209,179 | B2 | 2/2019 | Hollstein |
| 2004/0136139 | A1 | 7/2004 | Kummel |
| 2006/0239559 | A1* | 10/2006 | Maris .................... G06F 18/256 |
| | | | 382/183 |
| 2010/0121541 | A1 | 5/2010 | Behnke |
| 2011/0064274 | A1 | 3/2011 | Madsen et al. |
| 2012/0072068 | A1 | 3/2012 | Madsen et al. |
| 2012/0109614 | A1 | 5/2012 | Lindores |
| 2013/0292487 | A1 | 11/2013 | Ballu |
| 2015/0075067 | A1 | 3/2015 | Stowe et al. |
| 2015/0186387 | A1 | 7/2015 | Funabashi |
| 2015/0319911 | A1 | 11/2015 | Wilson et al. |
| 2017/0223947 | A1 | 8/2017 | Gall et al. |
| 2018/0024050 | A1 | 1/2018 | Hollstein |
| 2018/0084708 | A1 | 3/2018 | Neitemeier et al. |
| 2018/0153084 | A1* | 6/2018 | Calleija ................. A01B 79/005 |
| 2018/0240228 | A1 | 8/2018 | Jackson et al. |
| 2018/0259496 | A1* | 9/2018 | McPeek ............... G01N 33/025 |
| 2018/0279599 | A1 | 10/2018 | Struve |
| 2019/0150357 | A1* | 5/2019 | Wu ......................... H04N 7/188 |
| 2019/0162855 | A1* | 5/2019 | McPeek ............. G01C 21/1652 |
| 2019/0164300 | A1* | 5/2019 | Ardö .................... G06V 10/764 |
| 2020/0045953 | A1 | 2/2020 | Serrat et al. |
| 2020/0221681 | A1 | 7/2020 | Schwaderer et al. |
| 2022/0065835 | A1* | 3/2022 | Shore ................... G06V 20/188 |
| 2022/0100996 | A1* | 3/2022 | Fu ........................ A01M 21/046 |

FOREIGN PATENT DOCUMENTS

| | | |
|---|---|---|
| EP | 3299996 A1 | 3/2018 |
| EP | 3482632 A1 | 5/2019 |
| EP | 3482633 A1 | 5/2019 |
| FR | 2881608 A1 | 8/2006 |
| JP | 10112000 A * | 4/1998 |
| WO | 2009154765 A1 | 12/2009 |
| WO | 2012122988 | 9/2012 |
| WO | 2016025848 A1 | 2/2016 |
| WO | 2018142371 | 8/2018 |
| WO | 2019063255 | 4/2019 |
| WO | 2020127422 | 6/2020 |

OTHER PUBLICATIONS

Machine Translation of JPH10112000A (Year: 1998).*
Descour, M. and Dereniak, E. Computed-tomography imaging spectrometer: experimental calibration and reconstruction results, Applied Optics, vol. 34, No. 22, Aug. 1, 1995, 10 pages.
Arce, Gonzalo et. al. Compressive Coded Aperture Spectral Imaging, IEEE Signal Processing Magazine, Dec. 5, 2013, 11 pages.

* cited by examiner

AGRICULTURAL TREATMENT CONTROL DEVICE

CROSS-REFERENCE TO RELATED APPLICATION

This application is a national phase entry of International Application No.: PCT/EP2020/056401, filed on Mar. 10, 2020 and titled "Agricultural Treatment Control Device," which claims priority to and the benefit of French Patent Application No.: FR1902497, filed on Mar. 12, 2019 and titled "Dispositif Collaboratatif De Contrôle De Traitement Agricole" and also claims priority to and the benefit of French Patent Application No.: FR1908086, filed on Jul. 17, 2019 and titled "Dispositif De Contrôle De Traitement Agricole." The contents of the above-identified Applications are relied upon and incorporated herein by reference in their entirety.

FIELD OF THE INVENTION

The present invention relates to a device for controlling agricultural treatment to be mounted on an agricultural machine, integrating at least one controllable device for treating the field and at least one detector for weeds or foliar symptoms of deficiencies or diseases.

TECHNOLOGICAL BACKGROUND

Agricultural crops require regular maintenance in order to optimize agricultural production. Fertilization treatments, weed control, fight against deficiencies, or fight against diseases or pests are necessary in order to optimize the production yield of these crops.

Modern farming techniques tend to reduce inputs and treatments. To this end, they offer different methods to deal with these problems.

Prophylactic measures, the objective of which is to minimize the number of weeds present on an agricultural field competing with the crop, are widely used in the technical itineraries of field crops and market gardening. The following methods are recommended for this purpose:

Crop rotation was one of the first methods theorized at the start of the 20th century, as described in the document "Clyde E. Leighty, 1938 Yearbook of Agriculture", consisting of alternating fall and spring crops in order to break certain biological cycles of weeds;

plowing makes it possible to reduce the number of weeds in the crop by burying their seeds;

the false seedling, as described in the document "Evaluating Cover Crops for Benefits, Costs and Performance within Cropping System Niches", Agronomy Journal 97 (1). American Society of Agronomy: 322-32, by raising rapidly emerging weeds that are destroyed before the crop is planted also reduces the rate of weeds present in the crop.

The recommended curative measures, the objective of which is to avoid weed rising in the crop, and to have an impact on the yield of the crop, are as follows:

Chemical weeding, as described in the document «Pulvérisation en grandes cultures. Les clés de la réussite» Arvalis, helps prevent crop weeds. Phytosanitary products dedicated to chemical weed control are suitable either for a pre-emergence treatment making it possible to avoid the germination of the weeds present in the seed state, or for a post-emergence treatment, making it possible to destroy the weeds which have emerged in the crop. Chemical weeding is either selective, making it possible to treat a weed typology, or non-selective, making it possible to destroy all of the plants present in the plot at the time of treatment. Repeated use of the same chemical group of weedkiller results in the development of weed resistance, as well as phytotoxicity which has an impact on crop yield. Chemical weed killers are applied to the plot using a sprayer;

mechanical weeding as described in the document "La bineuse, un outil adapté à une large gamme de sol", Arvalis, in pre-emergence or post-emergence, makes it possible to destroy either the weed seedlings, or the weeds to a more advanced stage. This weeding process improves the soil structure and also disrupts the cycle of some pests. The tools used for mechanical weeding are weeder harrows or rotary hoes for complete weeding or hoeing machines with teeth for inter-row or under-row treatment;

alternative methods are developed, as described in the document "Alternative methods in weed management to the use of glyphosate and other herbicide", pesticide action network europe, 2018 (second edition), with in particular, the treatment of weeds by injection of an electric current, consisting in destroying each weed raised by bursting of the biological cells by causing an evaporation of the water contained in them, the treatments of the weeds by heat, whose methods are based on the use of laser, or high pressure hot water, can selectively destroy weeds by providing enough calories to destroy biological cells in the weed.

The recommended methods for treating deficiencies and diseases or for combating pests are essentially based on chemical treatments.

The treatments, whether chemical, mechanical or alternative, are carried out by a machine, generally attached to a motorized vehicle that moves in the crop.

These treatments are traditionally broad and do not take into account the presence or absence of weeds, pests, deficiencies or diseases, by treating the entire agricultural plot in a homogeneous manner. This method of control is imprecise and leads to overuse of phytosanitary products when the treatment is chemical, or a reduced work rate when the treatment is mechanical or alternative.

In this context, the thesis "Segmentation d'images pour la localisation d'adventices. Application à la réalisation d'un système de vision pour une pulvérisation spécifique en temps réel", Jérémie Bossu, University of Burgundy/CNRS 5158, Dec. 4, 2007, describes an experimental device for piloting spreading comprising a camera mounted on an agricultural machine, a central unit for detecting and calculating the optimal moment of spraying, taking into account the position of plants in the images acquired by the camera.

Document WO2012/032245, "Control system for agricultural spreading", describes a spreading control system comprising a set of spreading nozzles, means for mapping plants to be treated using, in one embodiment, cameras, and means for controlling the spreading according to the cartography data produced. This control system requires a first pass of the system in the agricultural plot in order to produce a mapping of this agricultural plot used in a second pass for the application of the treatment.

The document WO2012/122988, "Spray bar for selectively spraying a weedkiller composition on dicotyledons", describes a method making it possible to distinguish a category of weeds from other weeds in order to selectively treat the weeds concerned by detection. This process uses a stereoscopic camera in order to discern weeds, and does not make it possible to discern weeds of the same family, for example dicots, at early stages. Similarly, this process is not suitable for the detection of leaf symptoms of deficiencies or diseases.

The document US2018/0240228, "Selective plant detection and treatment using green luminance photometric machine vision scan with real time chromaticity operations and image parameter floors for low processing load", describes a method for detecting plants in an image and target it in a treatment. This process is not suitable for the selective detection of weed families, nor for the detection of leaf symptoms of deficiencies or diseases.

The document FR 3 063 206 comprises several embodiments, but the main embodiment comprises a single processing unit, which may use images from several cameras. Although this document also mentions "several processing units", this mention is brief, and the only practical embodiment is that of a plurality of control subsystems each comprising a processing unit.

Document CN 108 990 944 seems to describe a drone carrying a camera in the visible range and an infrared camera, the images of which are merged by a central processor.

Furthermore, the document FR1873313, "Hyperspectral acquisition detection device" describes a hyperspectral acquisition device with direct detection capable of detecting the shape, texture and spectral reflectance signature of a weed, or of leaf symptoms of deficiency or disease in a crop. This device is suitable for discerning weeds in the early stages, including weeds of the same family. Likewise, this device is suitable for the detection of leaf symptoms of deficiencies or diseases. The document FR1901202, "Hyperspectral detection device by fusion of sensors", describes an alternative direct detection method able to detect the presence of weeds, or foliar symptoms of deficiencies or diseases in a culture image. The documents FR1905916 and WO2019EP85847 repeat and supplement the two previous documents. These last four patent applications are incorporated herein by reference in their entirety for any useful purpose.

There are many problems with weed detection. The formulations of the chemical treatments for selective weeding, are addressed, for each of them, to a family of weeds, for example the dicotyledons, and have an effectiveness adapted to certain stages of development of the weed, for example the seedling stage. It therefore appears necessary to be able to discern with great reliability the weeds of a certain family among all the plants present in the agricultural plot. Equivalently, the detection of diseases or deficiencies in a culture requires high detection reliability in order to cover all of the affected areas in the culture.

In addition, agricultural treatment equipment, in particular spraying booms, can cover a large width, up to 50 m, of treatment; these ramps then have a large number of treatment nozzles. A detection system must therefore be capable of detecting with great reliability the presence of certain families of weeds or leaf symptoms of deficiencies or diseases, over a large width.

Thus, the technical problem of the invention consists in detecting the presence of weeds, or foliar symptoms of deficiencies or diseases in real time during the travel of an agricultural machine.

SUMMARY OF THE INVENTION

The present invention proposes to respond to this technical problem by equipping an agricultural machine with a set of sensors for weeds or foliar symptoms of deficiencies or diseases; said sensors of weeds or foliar symptoms of deficiencies or diseases collaborating in the detection and control of the treatment to be applied according to the detections made by each of said sensors of weeds or foliar symptoms of deficiencies or diseases.

To this end, the invention relates to an agricultural treatment control device intended to be mounted on an agricultural machine, said agricultural machine comprising at least one controllable treatment device, the agricultural treatment control device comprising:
  at least one deficiency or disease foliar symptoms or weeds detection system, each being suitable for attachment to the agricultural machine,
  a system for localising at least one deficiency or disease foliar symptoms or weeds detection system.

The invention is characterized in that at least one deficiency or disease foliar symptoms or weeds detection system collaborates with a deficiency or disease foliar symptoms or weeds detection system of which the detection zone partially overlaps with that of said deficiency or disease foliar symptoms or weeds detection system in order to collaboratively decide on the treatment to be applied to the detection zone of said deficiency or disease foliar symptoms or weeds detection. The device comprises a communication system between said at least one deficiency or disease foliar symptoms or weeds detection systems and at least one treatment device. This embodiment allows selective chemical, thermal or mechanical treatment in an agricultural plot.

Within the meaning of the invention, an agricultural treatment control device is composed of at least one sensor detecting the presence and localisation of weeds or leaf symptoms of deficiencies or diseases in an agricultural plot, and a collaborative automated decision-making process for applying a treatment; the treatment being able to be of different natures in particular chemical, mechanical or electrical.

According to one embodiment, said at least one deficiency or disease foliar symptoms or weeds detection system is adapted to collaborate with another deficiency or disease foliar symptoms or weeds detection system whose detection zone laterally partially overlaps with that of said deficiency or disease foliar symptoms or weeds detection system.

According to one embodiment, said at least one deficiency or disease foliar symptoms or weeds detection system is adapted to collaborate with a deficiency or disease foliar symptoms or weeds detection system whose detection zone temporally overlaps with that of said deficiency or disease foliar symptoms or weeds detection system.

According to one embodiment, the localisation system comprises a geolocalisation system and/or an inertial unit.

According to one embodiment, the device comprises at least two deficiency or disease foliar symptoms or weeds detection systems.

According to one embodiment, one, in particular each, deficiency or disease foliar symptoms or weeds detection system is equipped with a localisation system.

According to one embodiment, one, in particular each, deficiency or disease foliar symptoms or weeds detection system is adapted to collaborate with another, in particular the others, deficiency or disease foliar symptoms or weeds detection systems.

According to one embodiment, one, in particular each, deficiency or disease foliar symptoms or weeds detection system comprises a hyperspectral sensor.

According to one embodiment, a deficiency or disease foliar symptoms or weeds detection system is adapted to detect the presence of weeds or foliar symptoms of deficiency or disease from peculiarities specific to weeds or leaf symptoms of deficiencies or diseases.

According to one embodiment, a deficiency or disease foliar symptoms or weeds detection detection system is adapted to detect an area for a weed or a foliar symptom of deficiency or disease.

According to one embodiment, a deficiency or disease foliar symptoms or weeds detection system is supplemented with a probability of the presence of said characteristics specific to weeds or foliar symptoms of deficiencies or diseases.

According to one embodiment, the localisation system is adapted to localise the treatment to be applied to the detection area.

According to one embodiment, the device comprises a communication system between said deficiency or disease foliar symptoms or weeds detection systems.

According to one embodiment, a temporal overlap of said information of detections of weeds or leaf symptoms of deficiencies or diseases is obtained.

According to one embodiment, one, in particular each, detection system comprises a system for direct detection of features in the hyperspectral scene integrating a deep and convolutional neural network designed to detect at least one sought feature in said hyperspectral scene for a weed or foliar symptom of deficiency or disease from at least one compressed image of the hyperspectral scene.

According to one embodiment, one, in particular each, detection system comprises a system for detecting features in the hyperspectral scene comprising:
- a neural network configured to calculate a hyperspectral hypercube of the hyperspectral scene from at least one compressed image and an uncompressed image of the hyperspectral scene,
- a characterization module to detect the weed or the leaf symptom of deficiency or disease from the hyperspectral hypercube.

According to one embodiment, said agricultural treatment device comprises at least one spray nozzle, the flow rate or the pressure of said at least one spray nozzle being controlled by the collaborative decision of all of said at least two systems for detecting weeds or leaf symptoms of deficiencies or diseases. This embodiment allows a weeding chemical treatment of weeds or treatment of deficiencies or diseases in the field by optimizing the quantity of phytosanitary product spread in the agricultural field.

According to one embodiment, said agricultural treatment device comprises at least one LASER for destroying weeds, said at least one LASER being controlled by the collaborative decision of all of said at least two deficiency or disease foliar symptoms or weeds detection systems. This embodiment allows destructive treatment by LASER of the weeds in the field, by optimizing the work rate through the selection of the only weeds concerned by the treatment.

According to one embodiment, said agricultural treatment device comprises at least one high pressure water jet whose objective is the destruction of weeds, said at least one high pressure water jet being controlled by the collaborative decision of all of said at least two deficiency or disease foliar symptoms or weeds detection systems. This embodiment allows destructive treatment by high pressure water jet of the weeds in the field, by optimizing the work rate by selecting the only weeds concerned by the treatment.

According to one embodiment, said agricultural treatment device comprises at least one hoeing mechanical weeding tool, said at least one hoeing mechanical weeding tool being controlled by the collaborative decision of all of said at least two deficiency or disease foliar symptoms or weeds detection systems. This embodiment allows a mechanical destructive treatment of the weeds in the field, by optimizing the work rate by selecting the only weeds concerned by the treatment.

According to one embodiment, said agricultural treatment device comprises at least one electric weed control tool for destroying weeds, said at least one electric weed control tool being controlled by the collaborative decision of all of said at at least two deficiency or disease foliar symptoms or weeds detection systems. This embodiment allows a destructive treatment of electric weeding of the weeds in the field, by optimizing the work rate by selecting the only weeds concerned by the treatment.

According to one embodiment, the agricultural treatment device is localised.

According to one embodiment, all of said at least one deficiency or disease foliar symptoms or weeds detection system is adapted to collaboratively construct a map of the agricultural field travelled by said agricultural machine, said cartography being constructed by a geostatistical process with localised detection data representing the real state as measured by said at least one deficiency or disease foliar symptoms or weeds detection system. This embodiment allows the generation of a map of the detections of weeds and symptoms of deficiencies or diseases in the agricultural plot treated for statistical purposes and monitoring of treatment of agricultural fields.

According to one embodiment, the device further comprises a control screen, and said mapping of the traveled agricultural field is displayed on the control screen intended for the worker processing the agricultural field. This embodiment allows the worker performing the treatment of the agricultural field to follow in real time the application of the treatment in the agricultural field.

According to one embodiment, a processor is adapted to produce statistics on spraying, prevalence, species, densities, or stages of weeds or leaf symptoms of deficiencies or diseases present in the agricultural field using the mapping of the traveled agricultural field. This embodiment allows monitoring of treatments in the field.

According to one aspect, the invention relates to a collaborative agricultural processing control method intended to be mounted on an agricultural machine, said agricultural machine comprising at least one controllable processing device, the method for controlling agricultural treatment including:
- a collaborative decision of said at least one deficiency or disease foliar symptoms or weeds detection system of which the detection zones partially overlap, each being suitable for attachment to the agricultural machine and the localisation of the treatment to be applied to the detection area; and
- a communication between said deficiency or disease foliar symptoms or weeds detection systems with said at least one treatment device.

According to one embodiment, the collaborative control method of the treatment device mounted on an agricultural machine on which a set of deficiency or disease foliar symptoms or weeds detection systems is mounted, comprises, for each of at least two deficiency or disease foliar symptoms or weeds detection systems, the steps of:
- Acquisition of a new image datum from the ground of the travelled agricultural field on which an agricultural machine moves by means of said deficiency or disease foliar symptoms or weeds detection system; and Acquisition of additional position information from said deficiency or disease foliar symptoms or weeds detection system by means of an inertial unit and the localisation system; and Projection of said image data acquired by each of said deficiency or disease foliar symptoms or weeds detection systems on the ground plane; and Detection of the presence of weeds or leaf symptoms of deficiencies or diseases from said image data acquired and projected on said ground plane; and Calculation of the positions of weeds or leaf symptoms of deficiencies or diseases in the detection zone of said deficiency or disease foliar symptoms or weeds detection system; said position calculation using the localisation information of said localisation system of said deficiency or disease foliar symptoms or weeds detection system and the detection information in said image data; and Communication of said positions of weeds or leaf symptoms of deficiencies or diseases in the detection zone of said deficiency or disease foliar symptoms or weeds detection system to all the other deficiency or disease foliar symptoms or weeds detection systems; and Reception of said positions of weeds or foliar symptoms of deficiencies or diseases in the detection area of said detector of weeds or foliar symptoms of deficiencies or diseases from other deficiency or disease foliar symptoms or weeds detection systems; and Merging of said positions of weeds or leaf symptoms of deficiencies or diseases from all the deficiency or disease foliar symptoms or weeds detection systems; and Calculation of the command to be sent to the treatment device concerned by the detection zone of said deficiency or disease foliar symptoms or weeds detection system; and Issuance of the command to the treatment device concerned by the detection zone of said deficiency or disease foliar symptoms or weeds detection system.

According to one aspect, said projection uses the information coming from said inertial unit of said deficiency or disease foliar symptoms or weeds detection system in order to determine the angle at which the image data is taken relative to to the normal vector on the ground.

According to one aspect, communication of said positions of weeds or leaf symptoms of deficiencies or diseases in the detection zone of said deficiency or disease foliar symptoms or weeds detection system to others, in particular to the all other deficiency or disease foliar symptoms or weeds detection systems.

According to one aspect, the fusion is weighted according to the quality and the calculated distance of each detection.

The invention is assembled on an agricultural machine comprising at least one controllable processing device. The agricultural machine is such that said at least two deficiency or disease foliar symptoms or weeds detection systems are fixed on the support of said at least one controllable treatment device and communicate with each other and with the plurality of said at least one controllable processing device for, in operation, issuing the activation control command adapted to be received by each of said at least one controllable processing device for triggering the treatment on the target plant.

With regard to the operation of projecting said image data onto the ground plane, the roll, pitch and yaw information is used; this roll, pitch and yaw information being continuously calculated and kept up to date by each of said at least two deficiency or disease foliar symptoms or weeds detection systems by means of an attitude estimation algorithm using the raw information from said inertial unit on board each of said at least two deficiency or disease foliar symptoms or weeds detection systems. For example, the attitude estimation algorithm, used to calculate roll, pitch and yaw information, can be an extended Kalman filter, a Mahony or Madgwick algorithm. The document "A comparison of multisensor attitude estimation algorithm", A. Cirillo, P. Cirillo, G. De Maria, C. Natale, S. Pirozzi, describes and compares a set of data fusion algorithms from inertial units in order to extract the attitude, defined by the roll, pitch, and yaw angles, of the system.

As a variant, said attitude information can be calculated from the raw information from the inertial units of all of said at least two deficiency or disease foliar symptoms or weeds detection systems. Said raw information from the inertial units being exchanged by means of the communication system continuously connecting said at least two deficiency or disease foliar symptoms or weeds detection systems, the attitude estimation algorithm executed on each of said at at least two deficiency or disease foliar symptoms or weeds detection systems can use all of the raw information. Thus, the estimates of roll, pitch and yaw are consolidated by a set of similar, consistent and covariant measures. For example, an extended Kalman filter can be used in each of said at least two deficiency or disease foliar symptoms or weeds detection systems, by taking data from the inertial units of all of said at least two deficiency or disease foliar symptoms or weeds detection systems. The document "Data Fusion Algorithms for Multiple Inertial Measurement Units", Jared B. Bancroft and Gérard Lachapelle, Sensors (Basel), Jun. 29, 2011, 6771-6798, presents an alternative algorithm for merging raw data from a set of inertial units to determine attitude information.

As a variant, said attitude information can be calculated from the raw information of the inertial units to which the geolocalisation data of all of said at least two deficiency or disease foliar symptoms or weeds detection systems are added. Said raw information from the inertial units as well as the geolocalisation data being exchanged by means of the communication system connecting the said at least two deficiency or disease foliar symptoms or weeds detection systems, the attitude estimation algorithm can use all of the raw information. For example, an extended Kalman filter can be used in each of said at least two deficiency or disease foliar symptoms or weeds detection systems, taking the data from inertial units as well as the geolocalisation data of the set of said at least two deficiency or disease foliar symptoms or weeds detection systems. Furthermore, a method, as described in the document "Attitude estimation for accelerated vehicles using GPS/INS measurements", Minh-Duc Hua, July 2010, Control Engineering Practice Volume 18, Issue 7, July 2010, pages 723-732, allows a fusion of information from a geolocalisation system and an inertial unit.

Said projection on the ground of said image data is calculated according to the following relationships:

$$Img_{projected} = R^{-1} \cdot Img_{acquired}$$

$$R = Rz \cdot Ry \cdot Rx$$

$$R_x = \begin{bmatrix} 1 & 0 & 0 \\ 0 & \cos\gamma & -\sin\gamma \\ 0 & \sin\gamma & \cos\gamma \end{bmatrix}$$

-continued $$R_y = \begin{bmatrix} \cos\beta & 0 & \sin\beta \\ 0 & 1 & 0 \\ -\sin\beta & 0 & \cos\beta \end{bmatrix}$$

$$R_z = \begin{bmatrix} \cos\alpha & -\sin\alpha & 0 \\ \sin\alpha & \cos\alpha & 0 \\ 0 & 0 & 1 \end{bmatrix}$$

Where:

$Img_{projected}$ is the tensor containing the pixels of the image projected on the ground; and $Img_{acquired}$ is the tensor containing the pixels of said raw image data; and R is the matrix containing the rotations along the three roll axes, pitch and yaw; and α is the yaw angle; and β is the roll angle; and γ is the pitch angle.

Said image data projected on the ground is used to detect the presence of weeds or leaf symptoms of deficiencies or diseases from the specific characteristics of weeds or leaf symptoms of deficiencies or diseases in order to detect the areas in said image data in which the target plants are present. Each of the detections of the presence of weeds or leaf symptoms of deficiencies or diseases is supplemented with a probability of the presence of said peculiarities specific to weeds or leaf symptoms of deficiencies or diseases. This probability information is necessary for geostatistical calculations to decide on the application of a treatment on the target plant. For example, a hyperspectral sensor, as described in the document FR1873313, "Detection device with hyperspectral acquisition" or in the document FR1901202, "Hyperspectral detection device by fusion of sensors", or in the document FR1905916, "Detection device hyperspectral" can be used to detect the particularities sought for weeds or leaf symptoms of deficiencies or diseases.

With regard to the calculation of the positions of weeds or leaf symptoms of deficiencies or diseases, the detection of peculiarities specific to weeds or leaf symptoms of deficiencies or diseases in said projected image data indicates the presence of said target plants in the coordinate system of said projected image data. In addition, each of the projected image data is geolocalised from geolocalisation information obtained by means of said geolocalisation system of said deficiency or disease foliar symptoms or weeds detection system. Said obtained geolocalisation information corresponds to the position of said deficiency or disease foliar symptoms or weeds detection system at the time of capturing said image data. Said ground projection operation is applied to said geolocalisation information in order to obtain the projected coordinates on the ground of said projected image data. Thus the contours of the detection of said peculiarities specific to weeds or foliar symptoms of deficiencies or diseases detected on each of said at least two deficiency or disease foliar symptoms or weeds detection systems are geolocalised in the agricultural plot.

Each of said at least two deficiency or disease foliar symptoms or weeds detection systems obtains continuously, and by means of the communication system between the various deficiency or disease foliar symptoms or weeds detection systems, the geolocalised detection information of all the other deficiency or disease foliar symptoms or weeds detection systems. All of the information for said detections of weeds or leaf symptoms of deficiencies or diseases from all of said at least two deficiency or disease foliar symptoms or weeds detection systems is stored in a geographic database local to each of said at least two deficiency or disease foliar symptoms or weeds detection systems.

Each of said at least two deficiency or disease foliar symptoms or weeds detection systems calculates the geostatistics in real time of the presence of weeds or leaf symptoms of deficiencies or diseases from the set said geolocalised information on the detection of weeds or leaf symptoms of deficiencies or diseases and for which probability of presence information is provided. The computation of geostatistics uses a krigeage algorithm, as described in the book "Lognormal-de Wijsian Geostatistics for Ore Evaluation", D. G. Krige, 1981, ISBN 978-0620030069; Said krigeage algorithm making it possible to consolidate said information for detecting weeds or foliar symptoms of deficiencies or diseases from all of said at least two deficiency or disease foliar symptoms or weeds detection systems taking into account the respective probabilities of each of said detection. When said detection information for weeds or foliar symptoms of deficiencies or diseases consolidated by means of said geostatistical calculation confirms the presence of the desired characteristic of the weed or foliar symptoms of deficiency or disease, the geolocalisation detection information is added to the list of target plants to be treated.

Each of said at least two deficiency or disease foliar symptoms or weeds detection systems continuously calculates the instantaneous speed of movement by means of said geolocalisation information obtained by means of said geolocalisation system. The speed information is necessary in order to estimate the order time of said at least one agricultural processing device and to anticipate the processing time as a function of said agricultural processing device.

With regard to the calculation of the order to be sent to said at least one agricultural treatment device, each of said at least two deficiency or disease foliar symptoms or weeds detection systems estimates at all times, and for each of said target plants currently in range of said at least one treatment device, which of said at least one treatment device is most suitable for treating said target plant; For example, the spreading nozzle closest to the target plant is selected when said at least one treatment device is a spreading boom. Likewise, the treatment tool closest to the target plant can be selected. This determination uses the location data of the treatment device, expressed in the frame of reference of the field in which the weeds or leaf symptoms of deficiencies or diseases are geolocalised.

The control commands are transmitted to said at least one agricultural treatment device by means of communication between said at least two deficiency or disease foliar symptoms or weeds detection systems and said at least one agricultural treatment device.

With regard to controlling said at least one agricultural treatment device, all of the information from said detections of weeds or leaf symptoms of deficiencies or diseases is geolocalised and said at least one agricultural treatment device are actuated at the exact instant when said at least one agricultural treatment device is above the target plants.

In one aspect, the computerized methods described here are implemented by one or more computer programs executed by a processor of a programmable machine.

SUMMARY DESCRIPTION OF THE FIGURES

The manner of carrying out the invention as well as the advantages which ensue therefrom will emerge clearly from the embodiment which follows, given by way of indication but not limitation, in support of the appended figures in which FIGS. 1 to 17 represent:

FIG. 1: a schematic representation of the complete device; and

Figure 2:
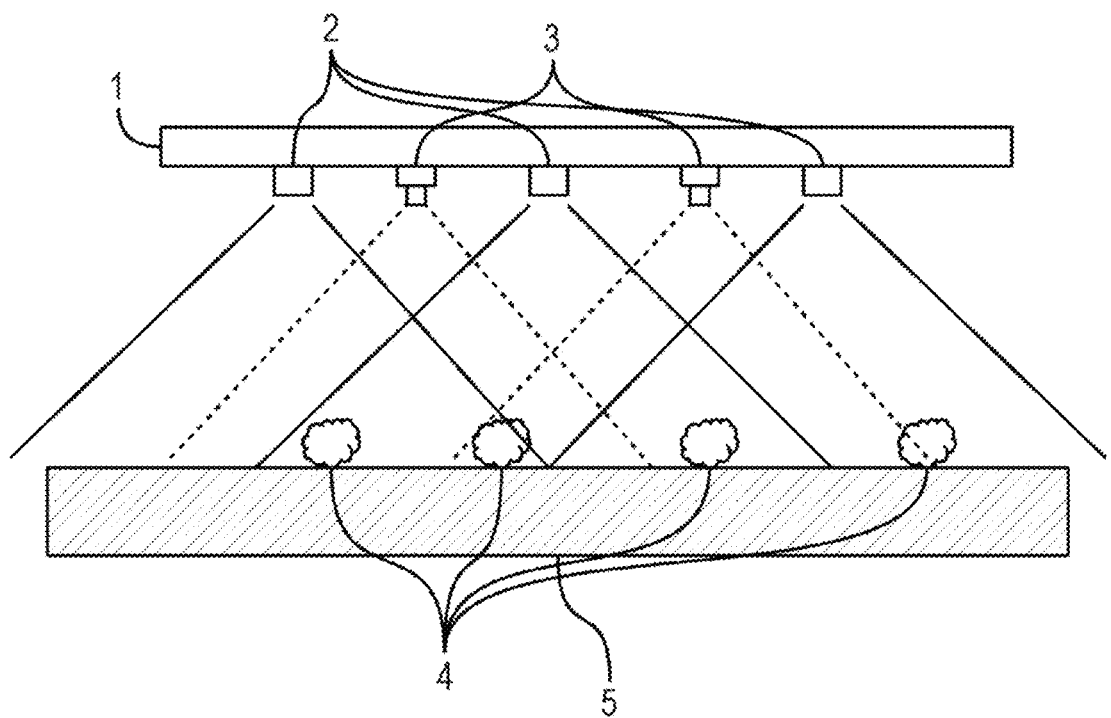
Figure 3:
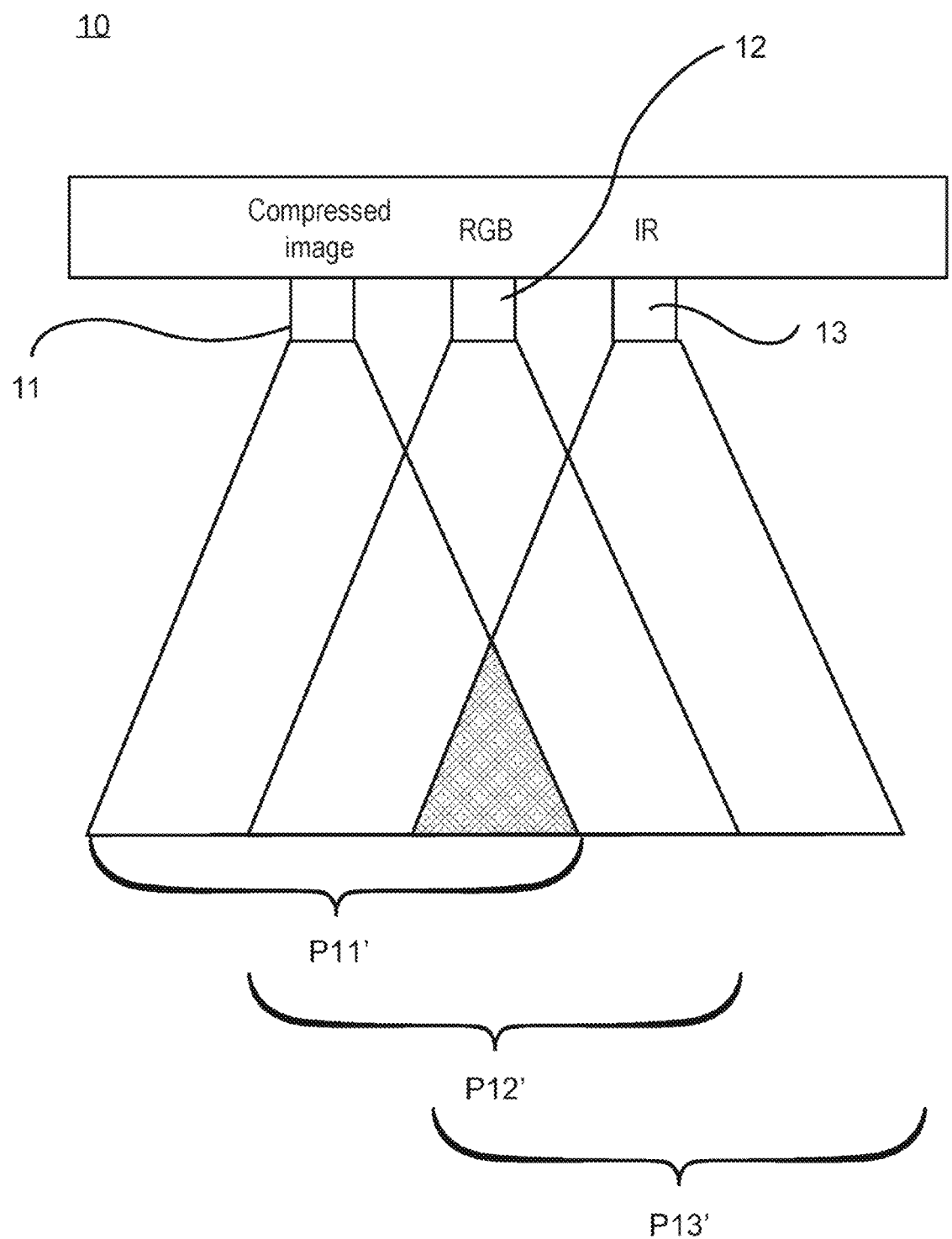
Figure 4:
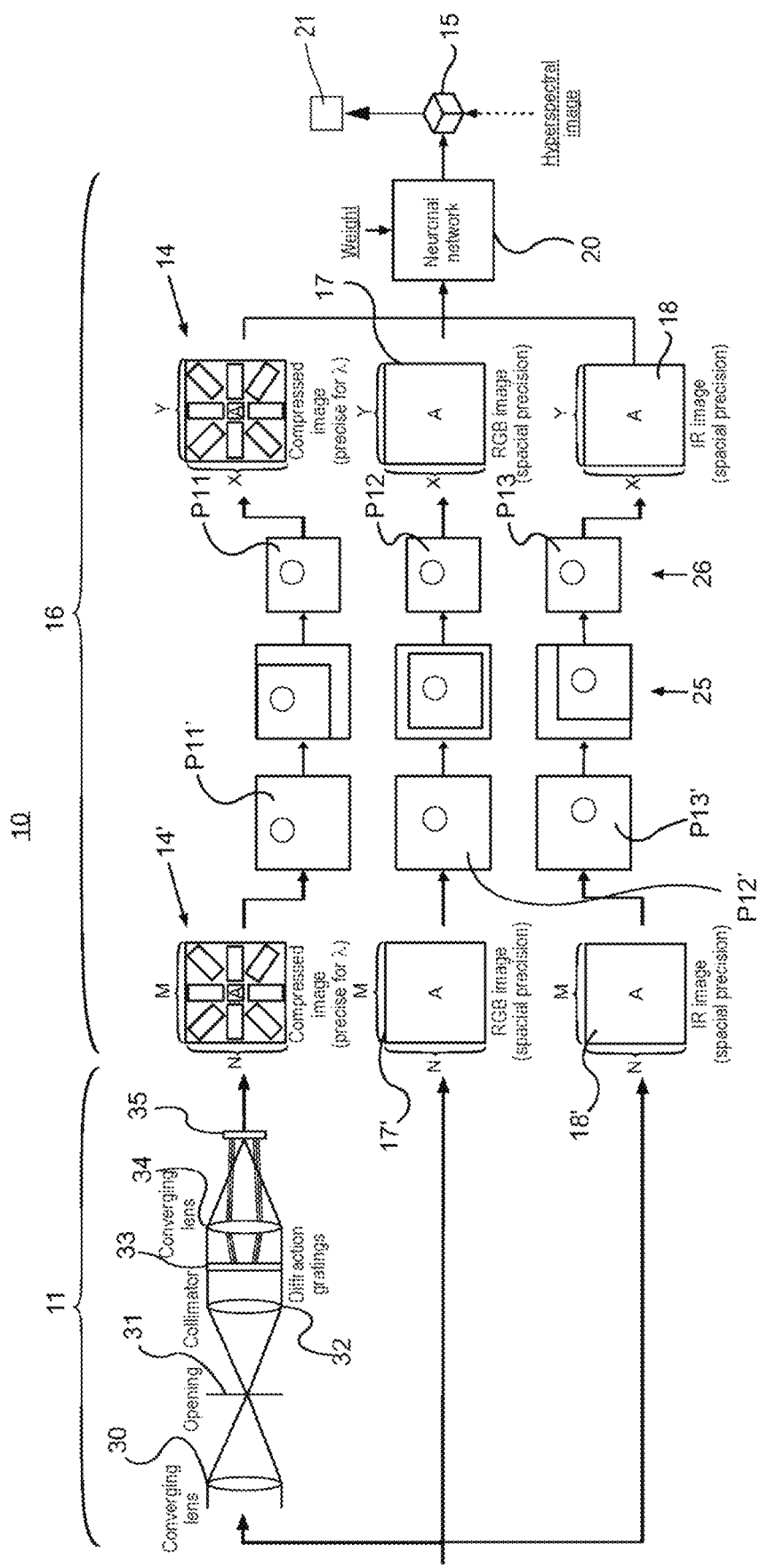
Figure 5:
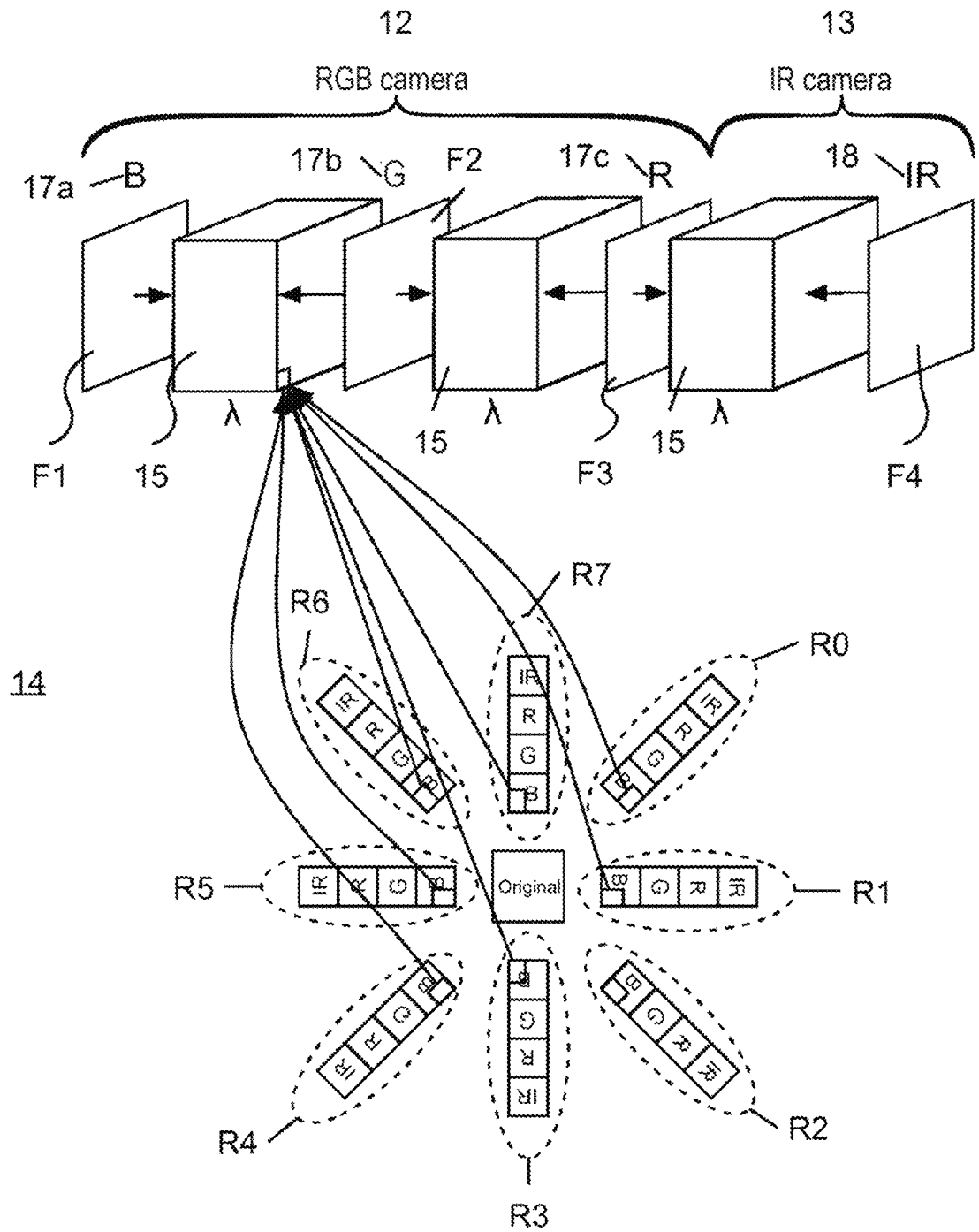
Figure 6:
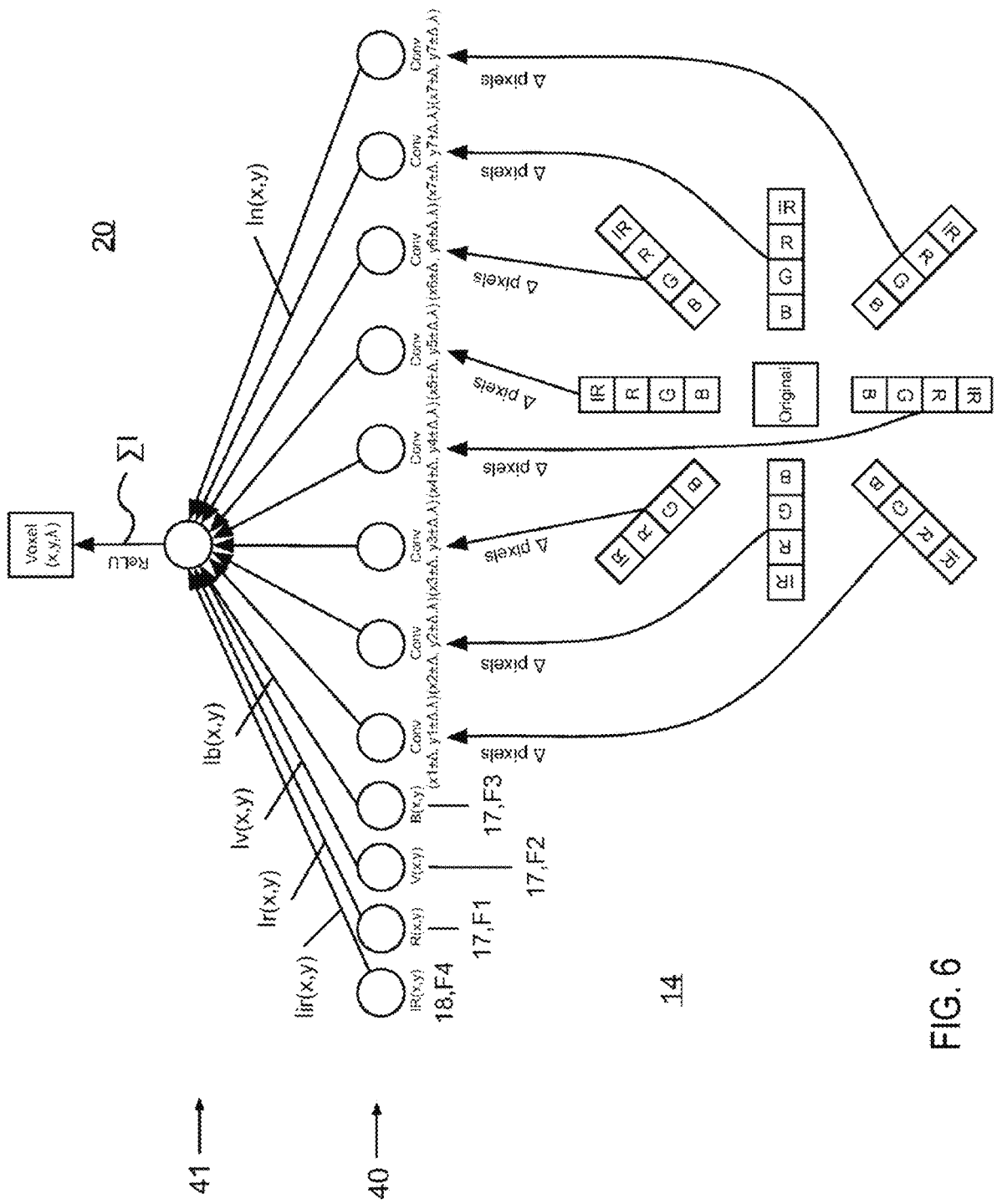

FIG. 2: a schematic structural representation of the elements of the device of FIG. 1;

FIG. 3: a schematic front view of a device for capturing a hyperspectral image according to an embodiment of the invention;

FIG. 4: a schematic structural representation of the elements of the device of FIG. 3;

FIG. 5: a schematic representation of the influence weights of the neural network of FIG. 4;

FIG. 6: a schematic representation of the architecture of the neural network of FIG. 4.

Figure 7:
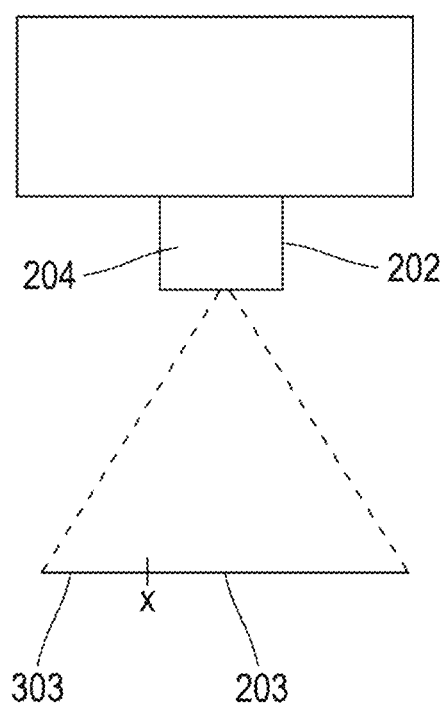
Figure 8:
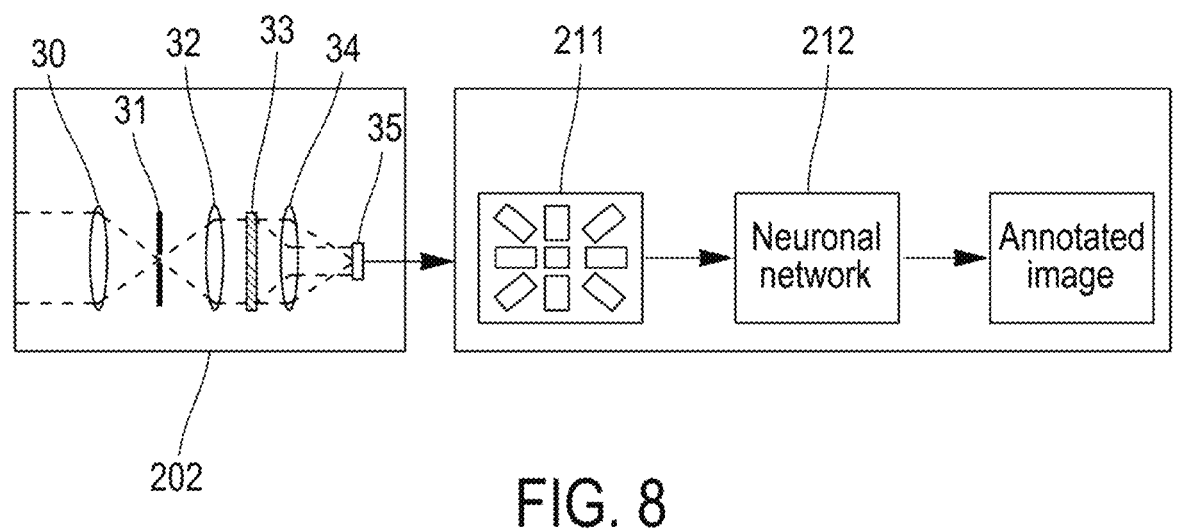
Figure 9:
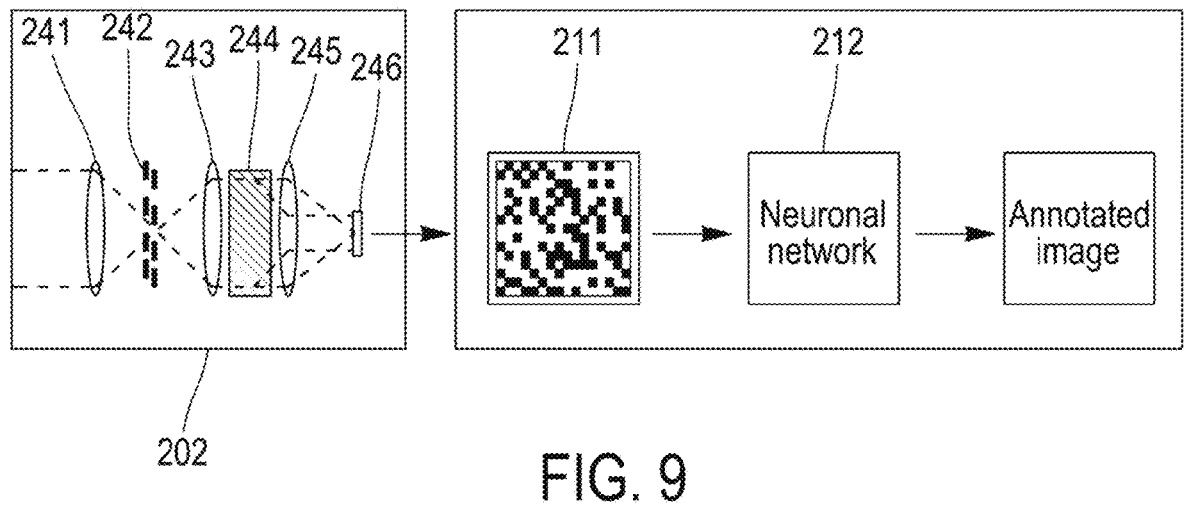
Figure 10:
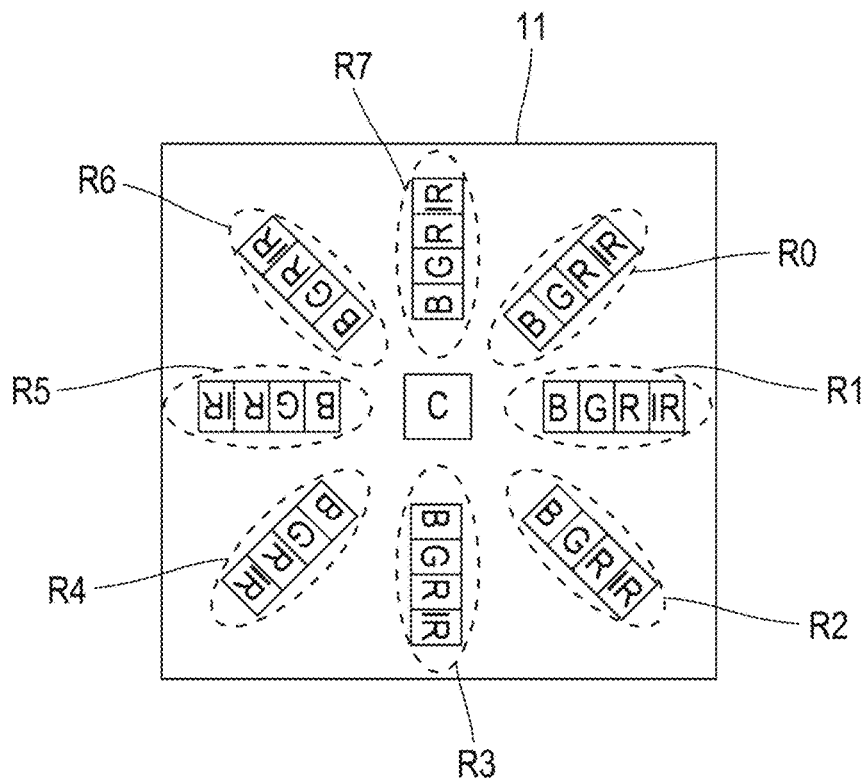
Figure 11:
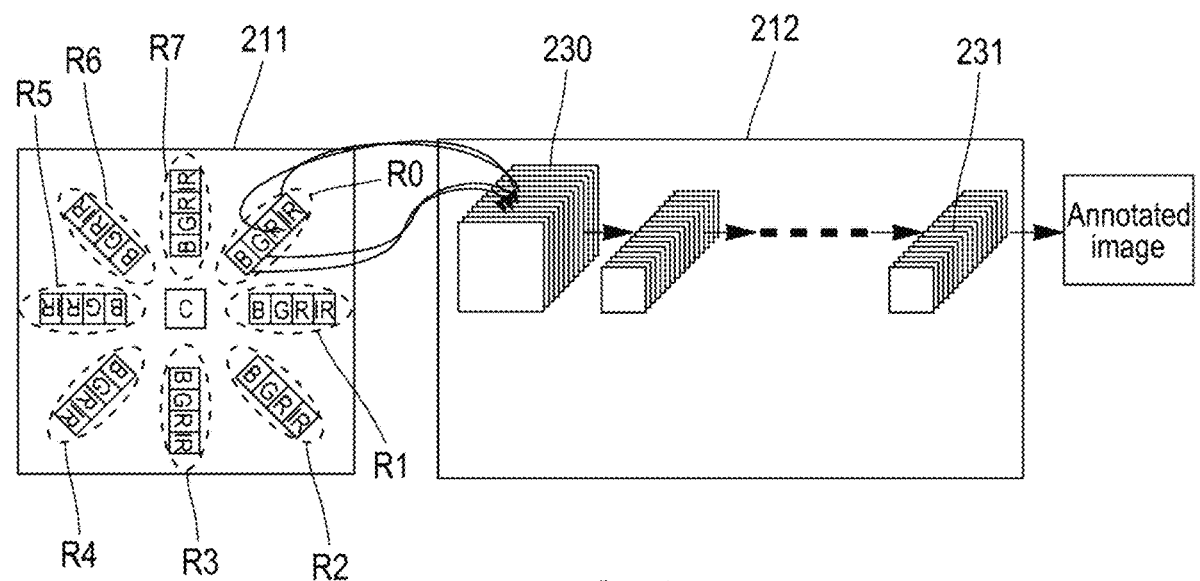

FIG. 7: a schematic front view of the elements of a capture and detection device in a hyperspectral scene according to an embodiment of the invention;

FIG. 8: a schematic structural representation of the elements of the device of FIG. 7;

FIG. 9: an alternative structural schematic representation of the elements of the device of FIG. 7;

FIG. 10: a schematic representation of the diffractions obtained by the acquisition device of FIG. 8;

FIG. 11: a schematic representation of the architecture of the neural network of FIG. 8.

Figure 12:
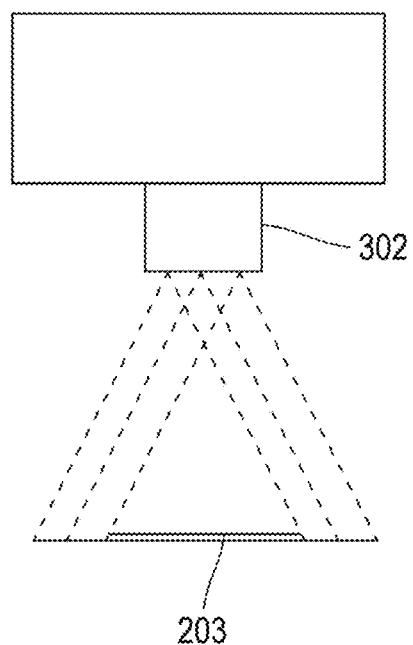
Figure 13:
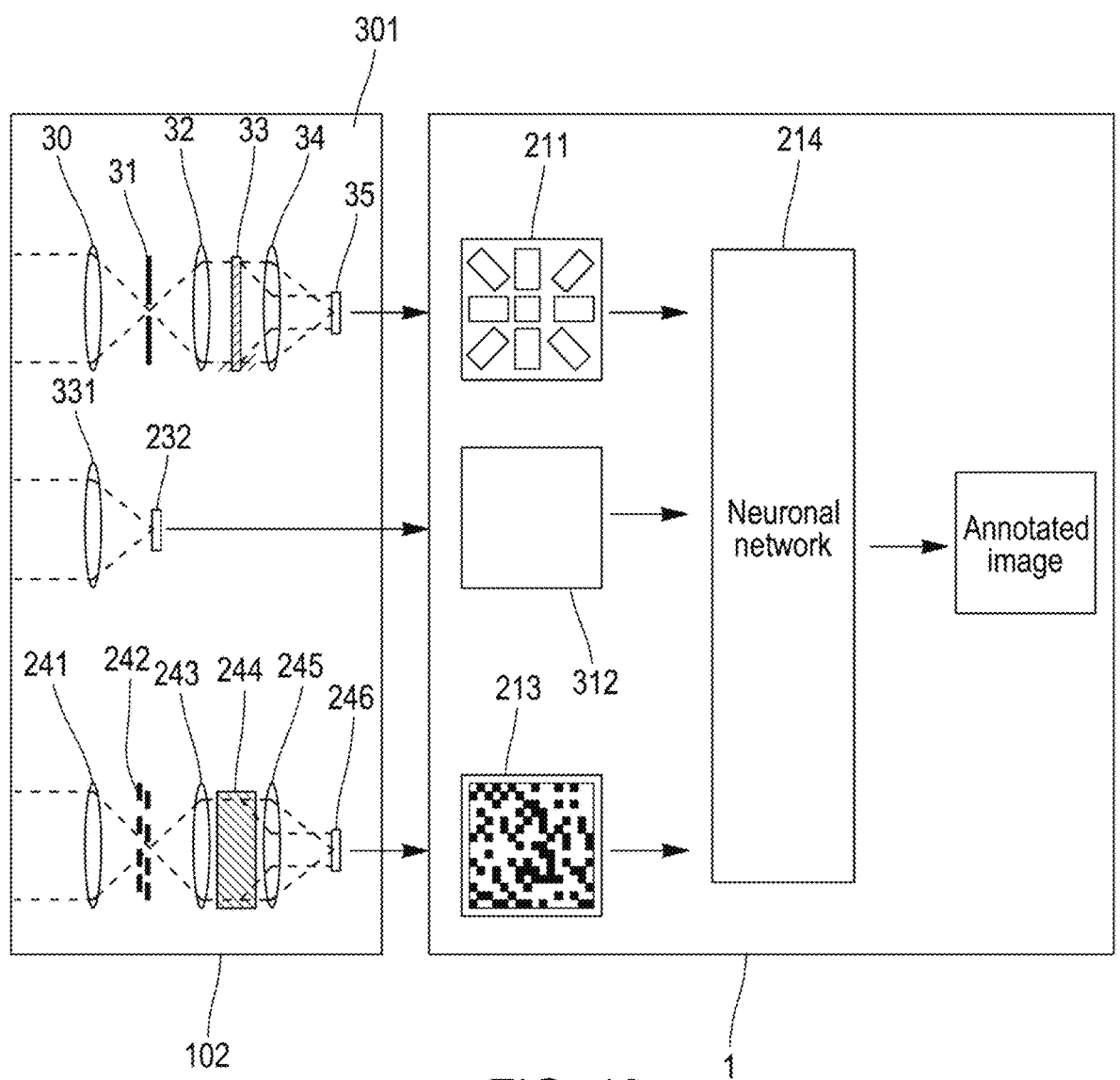
Figure 14:
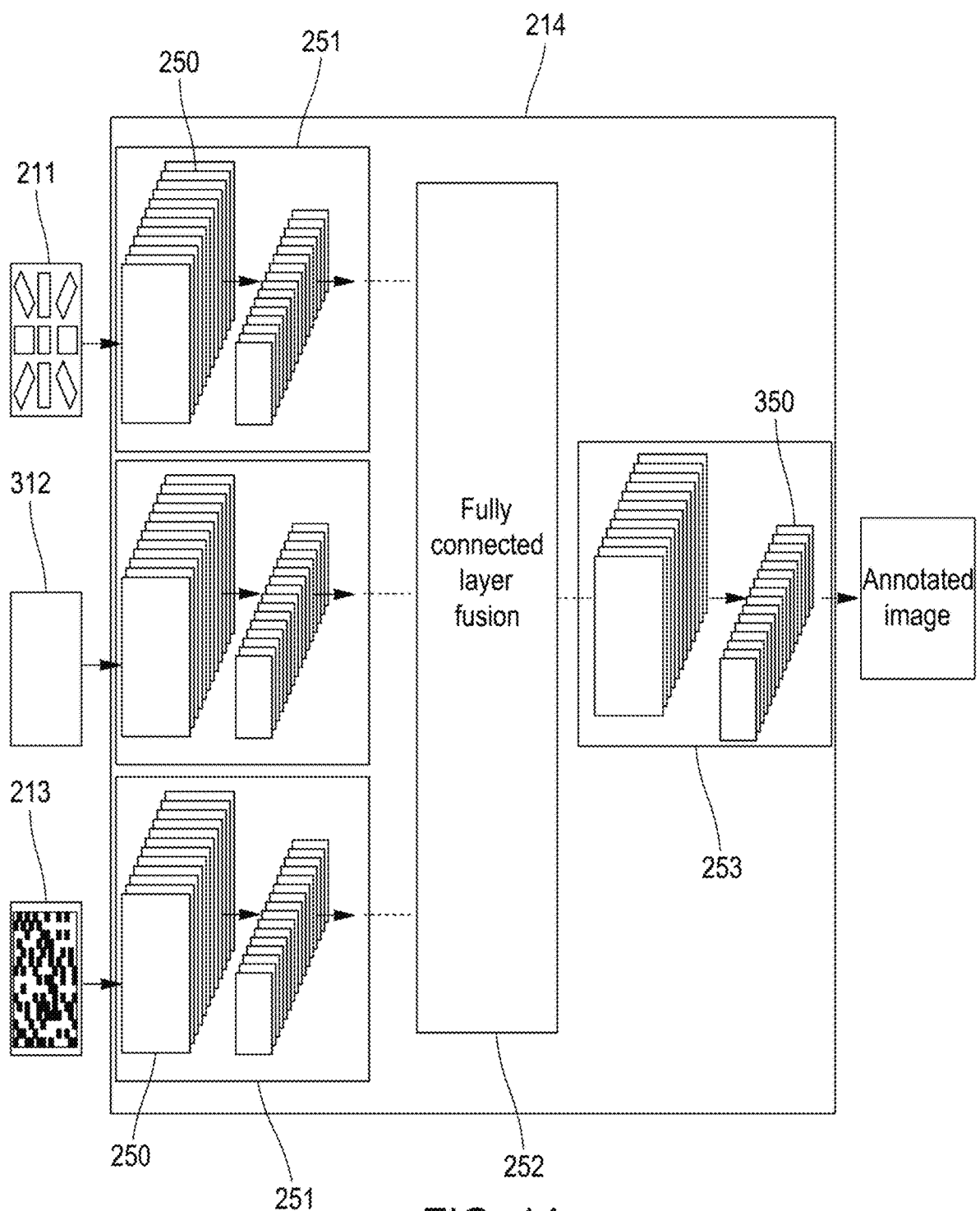

FIG. 12: a schematic front view of the elements of a capture and detection device in a hyperspectral scene according to a second embodiment of the invention;

FIG. 13: a schematic structural representation of the elements of the device of FIG. 12;

FIG. 14: a schematic representation of the architecture of the neural network of FIG. 13.

Figure 15:
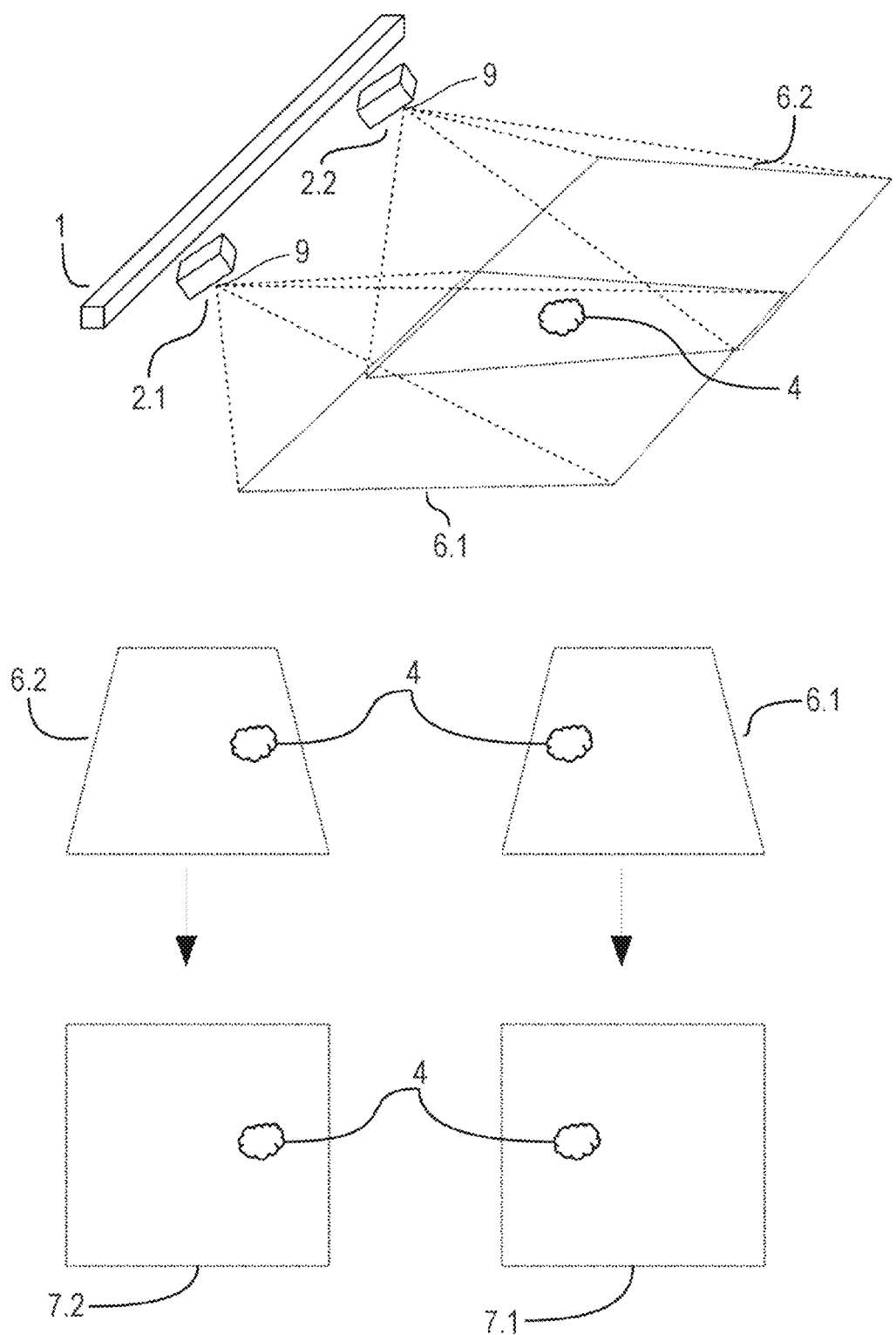
Figure 16:
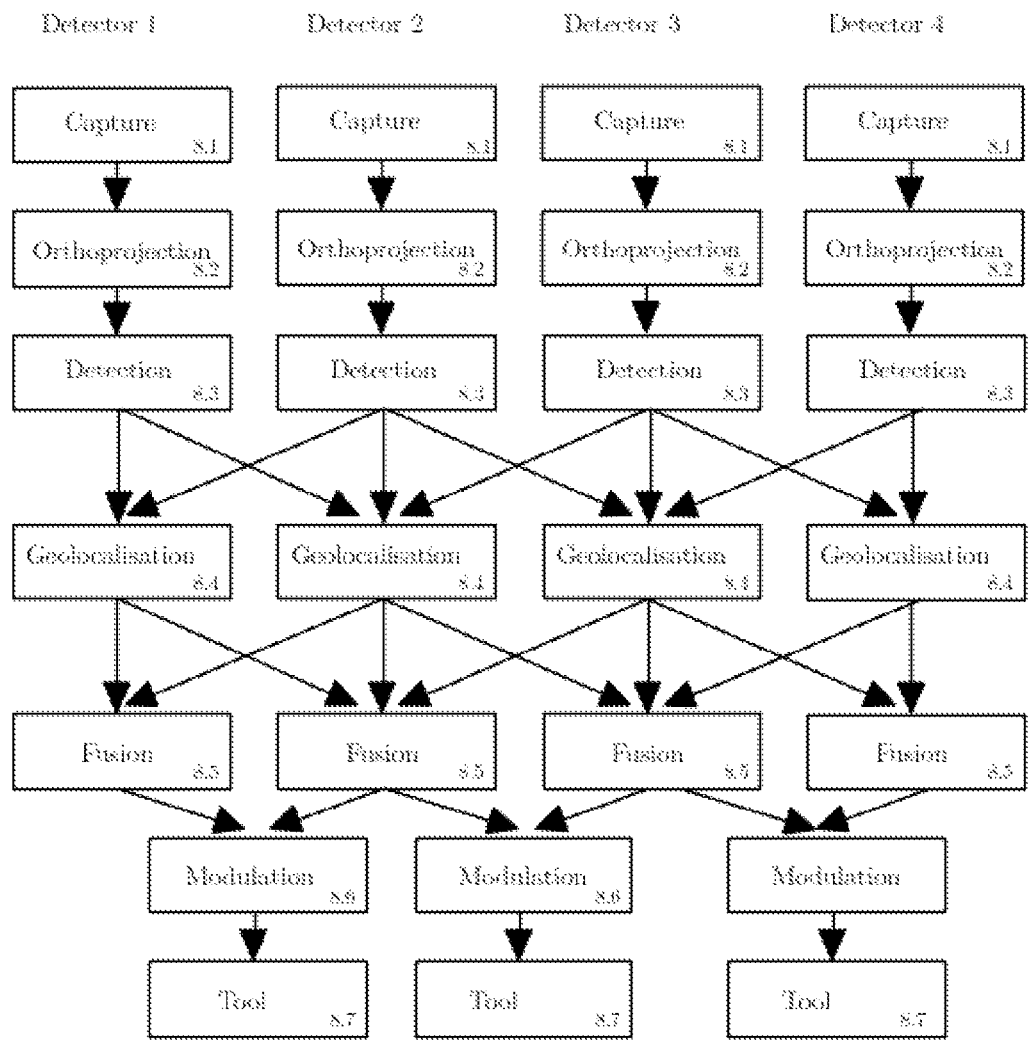
Figure 17:
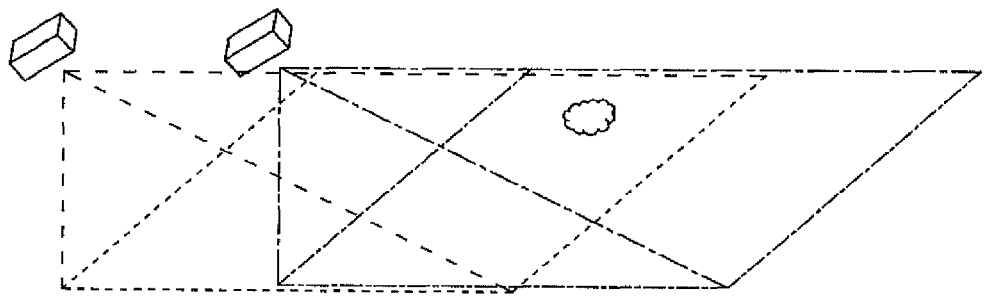
Figure 17:
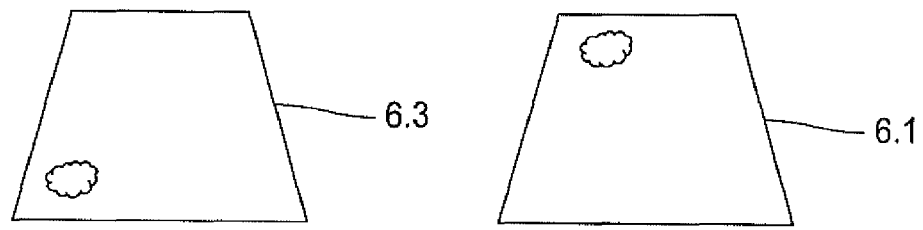
Figure 17:
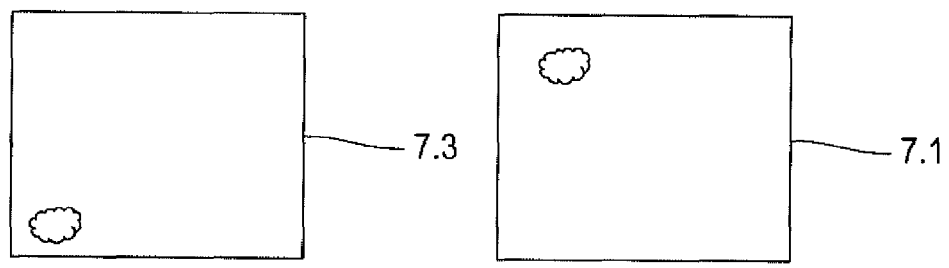

FIG. 15: a schematic structural representation, seen in projection, of the elements of the device of FIG. 1;

FIG. 16: a graph showing a collaborative piloting process for agricultural treatment devices; and FIG. 17 is a schematic representation similar to FIG. 15 for another embodiment.

DETAILED DESCRIPTION

By "direct", when we qualify the detection of feature, we thus describe that the result of output from the detection system is the sought feature. We exclude here the cases where the output of the detection system does not correspond to the sought feature, but only corresponds to an intermediary in the calculation of the feature. However, the output from the direct detection system can, in addition to corresponding to the feature sought, also be used for subsequent processing. In particular, by "direct", it is meant that the output of the feature detection system is not a hyperspectral cube of the scene which, in itself, does not constitute a feature of the scene.

By "compressed", we mean a two-dimensional image of a three-dimensional scene comprising spatial and spectral information of the three-dimensional scene. The spatial and spectral information of the three-dimensional scene is thus projected by means of an optical system onto a two-dimensional capture surface. Such a "compressed" image may include one or more diffracted images of the three-dimensional scene, or parts thereof. In addition, it can also include part of a non-diffracted image of the scene. Thus, the term "compressed" is used because a two-dimensional representation of three-dimensional spectral information is possible.

By "spectral", we understand that we go beyond, in terms of the number of frequencies detected, a "standard" RGB image of the scene.

By "standard", we refer, as opposed to a "compressed" image, to an image exhibiting no diffraction of the hyperspectral scene. However, such an image can be obtained by optical manipulations using reflecting mirrors or lenses.

By "non-homogeneous", we refer to an image whose properties are not identical on the whole image. For example, a "non-homogeneous" image can contain, at certain locations, pixels whose information essentially comprises spectral information at a certain respective wavelength band, as well as, in other locations, pixels the information of which essentially includes non-spectral information. Computer processing of such a "non-homogeneous" image is not possible, because the properties necessary for its processing are not identical depending on the locations in this image.

By "characteristic", we mean a characteristic of the scene—this characteristic can be spatial, spectral, correspond to a shape, a color, a texture, a spectral signature or a combination of these, and can in particular be interpreted semantically.

"Object" refers to the common meaning used for this term. Object detection on an image corresponds to the location and a semantic interpretation of the presence of the object on the imaged scene. An object can be characterized by its shape, color, texture, spectral signature or a combination of these characteristics.

FIG. 1 illustrates a cooperative agricultural treatment control device intended to be mounted on an agricultural machine 1, said agricultural machine 1 comprising at least one controllable agricultural treatment device 3; said cooperative agricultural treatment control device comprising at least two deficiency or disease foliar symptoms or weeds detection systems 2, each being mechanically adapted for attachment to the agricultural machine 1 and having a target viewing angle acquisition in the direction of advancement of said agricultural machine 1. As can be seen in particular in FIG. 1, the agricultural machine moves in the agricultural field 5 in a direction of advance. The detection systems 2 can be arranged spaced from each other in a horizontal direction transverse to the direction of advance. They can for example be carried by a transverse beam of the agricultural machine. To fix the ideas, we can define the "x" axis as the advancement axis of the agricultural machine, and "y" the horizontal transverse axis (substantially parallel to the main direction of the beam). By "horizontal" is meant the mean plane of the ground at the level of the agricultural machine. The agricultural treatment device 3 is controllable for treating an area to be treated downstream of the area imaged by the deficiency or disease foliar symptoms or weeds detection system 2 along the movement of the agricultural machine.

As illustrated in FIG. 2, the plurality of said at least two deficiency or disease foliar symptoms or weeds detection systems 2 is fixed on the agricultural machine so as to capture the visual information of the agricultural plot 5. Each of said at least two deficiency or disease foliar symptoms or weeds detection systems 2 has a detection field overlapping the detection field of at least one neighboring deficiency or disease foliar symptoms or weeds detection system 2. For deficiency or disease foliar symptoms or weeds detection systems which are not placed at the ends of the beam, their detection field may overlap the detection field of at least two deficiency or disease foliar symptoms or weeds detection systems 2. For example, a hyperspectral sensor, as described in the document FR1873313, "Detection device with hyperspectral acquisition" or in the document FR1901202, "Hyperspectral detection device by fusion of sensors", or in the document FR1905916, "Detection device hyperspectral", or in document WO2019EP85847, "Hyperspectral detection device", can be used for each of said at least two deficiency or disease foliar symptoms or weeds detection systems 2.

According to a first embodiment, the deficiency or disease foliar symptoms or weeds detection system 2 comprises a capture device 10 and a computerized characterization module 21. FIG. 3 illustrates a capture device 10 of a hyperspectral image 15 in three dimensions comprising three juxtaposed sensors 11-13. A first sensor 11 makes it possible to obtain a compressed image 14' of a focal plane P11' of an observed scene. As illustrated in FIG. 4, this first sensor 11 comprises a first converging lens 30 which focuses the focal plane P11' on an opening 31. A collimator 32 captures the rays passing through the opening 31 and transmits these rays to a diffraction grating 33. A second converging lens 34 focuses these rays from the diffraction grating 33 on a collection surface 35.

The structure of this optical network is relatively similar to that described in the scientific publication "Computed-tomography imaging spectrometer: experimental calibration and reconstruction results", published in APPLIED OPTICS, volume 34 (1995) number 22.

This optical structure makes it possible to obtain a compressed image 14', illustrated in FIG. 5, having several diffractions R0-R7 of the focal plane P11' arranged around a small non-diffracted image. In the example of FIGS. 3 to 6, the compressed image has eight distinct R0-R7 diffractions obtained with two diffraction axes of the diffraction grating 33 arranged as far apart as possible from one another in a plane normal to the optical axis, that is to say substantially orthogonal to one another.

Alternatively, three axes of diffraction can be used on the diffraction grating 33 so as to obtain a diffracted image 14' with sixteen diffractions. The three diffraction axes can be equally distributed, that is to say separated from each other by an angle of 60°.

Thus, in general, the compressed image comprises 2R+1 diffractions if one uses R evenly distributed diffraction gratings, that is to say separated by the same angle from each other.

The capture surface 35 can correspond to a CCD sensor (for "charge-coupled device" in English, that is to say a charge transfer device), to a sensor CMOS (for "complementary metal-oxide-semiconductor" in Anglo-Saxon literature, a technology for manufacturing electronic components), or any other known sensor. For example, the scientific publication "Practical Spectral Photography", published in Eurographics, volume 31 (2012) number 2, proposes to combine this optical structure with a standard digital camera to capture the compressed image.

Preferably, each pixel of the compressed image 14' is coded on 8 bits thus making it possible to represent 256 colors.

A second sensor 12 makes it possible to obtain a non-diffracted image 17' of a focal plane P12' of the same observed scene, but with an offset induced by the offset between the first 11 and the second sensor 12. This second sensor 12 corresponds to an RGB sensor, that is to say a sensor making it possible to code the influence of the three colors Red, Green and Blue of the focal plane P12'. It makes it possible to account for the influence of the use of a blue filter F1, a green filter F2 and a red filter F3 on the observed scene.

This sensor 12 can be produced by a CMOS or CCD sensor associated with a Bayer filter. Alternatively, any other sensor can be used to acquire this RGB image 17'. Preferably, each color of each pixel of the RGB image 17' is coded on 8 bits. Thus, each pixel of the RGB image 17' is coded on 3 times 8 bits. Alternatively, a monochrome sensor could be used.

A third sensor 13 makes it possible to obtain an infrared image 18', IR, of a third focal plane P13' of the same observed scene with also an offset with the first 11 and the second sensors 12. This sensor 13 makes it possible to account for the influence of the use of an infrared filter F4 on the observed scene.

Any type of known sensor can be used to acquire this IR image 18. Preferably, each pixel of the IR image 18 is coded on 8 bits. Alternatively, only one or the other of sensor 12 and sensor 13 is used.

The distance between the three sensors 11-13 can be less than 1 cm so as to obtain a significant overlap of the focal planes P11'-P13' by the three sensors 11-13. The sensors are for example aligned along the x axis. The topology and the number of sensors can vary without changing the invention.

For example, the sensors 11-13 can acquire an image of the same observed scene by using semi-transparent mirrors to transmit the information of the scene observed to the various sensors 11-13. FIG. 3 illustrates a device 10 comprising three sensors 11-13. As a variant, other sensors can be mounted on the device 10 to increase the information contained in the hyperspectral image. For example, the device 10 can integrate a sensor whose wavelength is between 0.001 nanometer and 10 nanometers or a sensor whose wavelength is between 10,000 nanometer and 20,000 nanometers.

As illustrated in FIG. 4, the device 10 also includes a construction module 16 for a hyperspectral image 15 from the different diffractions R0-R7 of the diffracted image 14' and the non-diffracted 17', 18'.

In the example of FIGS. 3 to 6, in which the sensors 11-13 are juxtaposed, a preprocessing step is carried out to extract a focal plane P11 P13 present on each of the images 14', 17'-18' acquired by the three sensors 11-13. This pretreatment consists, for each focal plane P11'-P13', in isolating the common part from the focal planes P11'-P13' then extracting 26 this common part to form the image 14, 17-18 of each focal plane P11-P13 observed by the specific sensor 11-13. The part of each image 14', 17'-18' to be isolated can be defined directly in a memory of the capture device 10 according to the respective positioning choices for the sensors 11-13, or a learning step can be used to identify the part to be isolated 25.

Preferably, the images 17'-18' from RGB and IR sensors are cross-checked using a cross-correlation in two dimensions. The extraction of the focal plane of the diffracted image 14' is calculated by interpolation of the x and y offsets between the sensors 12-13 with reference to the position of the sensor 11 of the diffracted image by knowing the distance between each sensor 11-13. This preprocessing step is not always necessary, in particular, when the sensors 11-13 are configured to capture the same focal plane, for example with the use of semi-transparent mirrors.

When the images 14, 17 and 18 of each focal plane P11-P13 observed by each sensor 11-13 are obtained, the construction module 16 implements a neural network 20 to form a hyperspectral image 15 from the information in these three images 14, 17-18.

This neural network 20 aims at determining the intensity $I_{X,Y,\lambda}$ of each voxel $V_{X,Y,\lambda}$ of the hyperspectral image 15.

To do this, as illustrated in FIG. 6, the neural network 20 comprises an input layer 40, capable of extracting the information from the images 14, 17-18, and an output layer 41, able to process this information so as to create information for the considered voxel $V_{X,Y,\lambda}$.

The first neuron of the input layer 40 makes it possible to extract the intensity $I_{IR}(x,y)$ from the IR image 18 as a function of the x and y coordinates of the sought voxel $V_{X,Y,\lambda}$. For example, if the IR image 18 is coded on 8 bits, this first neuron transmits to the output layer 41 the 8-bit value of the pixel of the IR image 18 at the sought x and y coordinates. The second neuron of the input layer 40 performs the same task for the red color 17a of the RGB image 17.

According to the previous example, each color being coded on 8 bits, the sought intensity $I_R(x; y)$ is also coded on 8 bits. The third neuron searches for the intensity $I_V(x; y)$ in the same way for the green color 17b and the fourth neuron searches for the intensity $I_B(x; y)$ for the blue color 17c. Thus, for these first four neurons, it is very easy to obtain the intensity, because it is enough to use the position in x and y of the desired voxel.

The following neurons of the input layer 40 are more complex, since each of the following neurons is associated with a diffraction R0-R7 of the diffracted image 14.

These neurons seek the intensity of a specific diffraction $I_n(x, y)$ as a function of the position in x and y, but also of the wavelength λ of the sought voxel $V_{X,Y,\lambda}$.

This relation between the three coordinates of the voxel $V_{X,Y,\lambda}$ and the position in x and y can be coded in a memory during the integration of the neural network 20.

Preferably, a learning phase makes it possible to define this relationship using a known model, the parameters of which are sought from representations of known objects. An example model is defined by the following relation:

$$\begin{cases} x_n = x + x_{offsetX}(n) + \lambda \cdot \lambda_{sliceX} \\ y_n = y + y_{offsetY}(n) + \lambda \cdot \lambda_{sliceY} \end{cases}$$

with:
n=floor (M(dt−1)/DMAX);
n between 0 and M, the number of diffractions of the compressed image;
λ=(dt−1)mod(DMAX/M);
dt between 1 and DMAX;
xt between 0 and XMAX;
yt between including between 0 and YMAX;
XMAX the size along the x axis of the tensor of order three of the input layer;
YMAX the size along the y axis of the tensor of order three of the input layer;
DMAX the depth of the tensor of order three of the input layer;
$\lambda_{sliceX}$, the spectral step constant along the x axis of said compressed image;
$\lambda_{sliceY}$, the spectral step constant along the y axis of said compressed image;
$x_{offsetX}(n)$ corresponding to the offset along the x axis of the diffraction n;
$y_{offsetY}(n)$ corresponding to the offset along the y axis of the diffraction n.
Floor is a well-known truncation operator.
Mod represents the mathematical operator modulo.

A learning phase therefore makes it possible to define the parameters $\lambda_{sliceX}$, $\lambda_{sliceY}$, $x_{offsetx}(n)$, and $v_{offsetY}(n)$, so that each neuron can quickly find the intensity of the corresponding pixel. As a variant, other models are possible, in particular depending on the nature of the used diffraction grating 33.

In addition, the information related to the intensity of the pixel $I_n(x, y)$ sought by each neuron can be determined by a product of convolution between the intensity of the pixel of the compressed image 14 and of its close neighbors in the different R0-R7 diffractions. According to the previous example, the output of these neurons from the input layer 40 is also coded on 8 bits.

All these different intensities of the input layer 40 are injected into a single neuron of the output layer 41 which has the function of combining all this information and of providing the value of the intensity $l_{X,Y,\lambda}$ of the desired voxel.

To do this, this output neuron 41 associates a weight with each item of information as a function of the wavelength λ of the voxel sought. Following this modulation on the influence of the contributions of each image 17-18 and of each diffraction R0-R7, this output neuron 41 can add up the contributions to determine an average intensity which will form the intensity $I_{x,y,\lambda}$ of the sought voxel $V_{X,Y,\lambda}$, for example coded on 8 bits. This process is repeated for all the coordinates of the voxel $V_{X,Y,\lambda}$, so as to obtain a hypercube containing all the spatial and spectral information originating from the non-diffracted images 17-18 and from each diffraction R0-R7. For example, as illustrated in FIG. 5, to find the intensity $I_{x,y,\lambda}$ of a voxel $V_{X,Y,\lambda}$ whose wavelength is 500 nm, that is to say a wavelength between that of blue (480 nm) and that of green (525 nm), the output neuron 41 will use the spatial information of the non-diffracted images obtained with blue F1 and green F2 filters as well as the information of the obtained different R0-R7 diffractions as a function of the wavelength considered. It is possible to configure the neural network 20 so as not to take some of the diffractions R0-R7 into account so as to limit the time for calculating the sum of the contributions. In the example of FIG. 5, the third diffraction R2 is not considered by the neuron of the output layer 41. The weight of each contribution as a function of the wavelength λ of the sought voxel $V_{X,Y,\lambda}$ can also be defined during the implantation of the neural network 20 or determined by a learning phase. Learning can be carried out by using known scenes captured by the three sensors 11-13 and by determining the weights of each contribution for each wavelength λ so that the information from each known scene corresponds to the information contained in the known scenes. This learning can be carried out independently or simultaneously with learning the relationships between the three coordinates of the voxel $V_{X,Y,\lambda}$ and the position in x and y on the diffracted image 14. This neural network 20 can be implemented in an on-board system so as to process in real time the images from the sensors 11-13 to define and store a hyperspectral image 15 between two acquisitions of the sensors 11-13. For example, the on-board system may include a power supply for the sensors 11-13, a processor configured to perform the calculations of the neurons of the input layer 40 and the output layer 41 and a memory integrating the weights of each neuron of the input layer 40 as a function of the wavelength λ. As a variant, the different treatments can be carried out independently on several electronic circuits without changing the invention. For example, an acquisition circuit can acquire and transmit the information originating from the neurons of the first layer 40 to a second circuit which contains the neuron of the second layer 41.

The invention thus makes it possible to obtain a hyperspectral image 15 quickly and with great discretization in the spectral dimension. The use of a neural network 20 makes it possible to limit the complexity of the operations to be carried out during the analysis of the diffracted image 14. In addition, the neural network 20 also allows the association of the information of this diffracted image 14 with those of non-diffracted images 17-18 to improve the precision in the spatial dimension.

A computerized characterization module 21 is used downstream to determine a weed or a leaf symptom of deficiency or disease. For example, the input of the computerized characterization module is the hyperspectral image 15 in three dimensions. The computerized characterization module can for example apply a predefined treatment, characterizing the weed or the leaf symptom of deficiency or disease, to the hyperspectral image 15 in three dimensions, and outputting a presence or absence of the weed or the leaf symptom of deficiency or disease.

The computerized characterization module can for example apply, as described in the article "Hyperspectral image analysis techniques for the detection and classification of the early onset of plant disease and stress", Amy Lowe, Nicola Harrison and Andrew P. French, Plant Methods (2017), an index-based detection (for example the "Normalized Difference Vegetation Index"—NDVI—or "Photochemical Reflectance Index" (PRI)), in order to pre-process the hyperspectral image 15 in three dimensions by selecting a subset of spectral bands which are assembled by means of an index. For example, the PRI index is a two-dimensional image composed of the bands at 531 nm and 570 nm by the equation $Img=(R_{531}-R_{570})/(R_{531}+R_{570})$, where $R_n$ represents the intensity of the voxel with coordinates (x; y; n) of the hyperspectral cube. The resulting image identifies the presence of plants in the image. The value in one pixel is compared to a pre-defined scale to classify the detection in this pixel. Typically, in the resulting image, a value in a pixel of between −0.2 and 0.2 indicates the presence of a healthy plant in this pixel.

Other indices are applicable, each one making it possible to process the hyperspectral image and to detect the presence either of a weed, or of a leaf symptom of deficiency or disease, or the presence of a plant. The potentially applicable indices include the following:

"Normalized difference vegetation index" (NDVI), defined by the equation: (RNIR−RRED)/(RNIR+RRED), with RRED=680 nm, RNIR=800 nm, used to detect the presence of plants;

"Red edge" NDVI, defined by the equation $(R_{750}-R_{705})/(R_{750}+R_{705})$, used to detect the presence of plants;

"Simple ratio index" (SRI), defined by the equation RNIR/RRED with RRED=680 nm, RNIR=800 nm, allowing to detect the presence of plants;

"Photochemical reflectance index" (PRI), defined by the equation $(R_{531}-R_{570})/(R_{531}+R_{570})$, used to detect the vigor (or good health) of a plant;

"Plant senescence reflectance index" (PSRI), defined by the equation (Red Green)/NIR, where Red represents the sum of the intensities of the voxels with wavelengths between 620 and 700 nm, Green represents the sum of intensities of voxels with wavelengths between 500 and 578 nm, NIR represents the sum of the intensities of voxels with wavelengths between 700 and 1000 nm, making it possible to detect the senescence of a plant, the stress of a vegetable or the maturity of a fruit;

"Normalized phaeophytinization index" (NPQI), defined by the equation $(R_{415}-R_{435})/(R_{415}+R_{435})$, used to measure the degradation of leaf chlorophyll;

"Structure Independent Pigment Index" (SIPI), defined by the equation $(R_{800}-R_{445})/(R_{800}+R_{680})$, used to detect the vigor (or good health) of a plant; and "Leaf rust disease severity index" (LRDSI), defined by equation $6.9\times(R_{605}/R_{455})-1.2$, used to detect rust disease in wheat leaves.

Any other index suitable for detecting a particular disease or stress can be used.

If applicable, the predefined equation gives a probability of the presence of the weed or the foliar symptom of deficiency or disease. If necessary, an additional output from the computerized characterization module is a localisation of the weed or the leaf symptom of deficiency or disease in image 17 or 18.

In the context of the present patent application, the detection system described above is considered to be a single detection system, even if it uses different sensors whose information is merged to detect a weed or deficiency or disease leaf syndrome.

According to a second embodiment, the deficiency or disease foliar symptoms or weeds detection system 2 comprises a capture device 202. FIG. 7 illustrates a device 202 for capturing a hyperspectral scene 203 comprising a sensor, or acquisition system 204, making it possible to obtain a compressed image in two dimensions 211 of a focal plane 303 of an observed scene. The hyperspectral scene can be identified in space by means of an orthonormal coordinate system (x; y; z) not shown.

As illustrated in FIG. 8, the capture device 202 is similar to that described above.

This optical structure makes it possible to obtain a compressed image 211, illustrated in FIG. 10, presenting several diffractions R0-R7 of the focal plane 303 arranged around a small non-diffracted image C.

Alternatively, as illustrated in FIG. 9, the capture device 202 can comprise a first converging lens 241 which focuses the focal plane 303 on a mask 242. A collimator 243 captures the rays passing through the mask 242 and transmits these rays to a prism 244. A second converging lens 245 focuses these rays coming from the prism 244 on a collection surface 246. The mask 242 defines a coding for the image 213.

The structure of this optical assembly is relatively similar to that described in the scientific publication "Compressive Coded Aperture Spectral Imaging", IEEE Signal Processing Magazine, Volume 31, Issue 1, Gonzalo R. Arce, David J. Brady, Lawrence Carin, Henry Arguello, and David S. Kittle.

Alternatively, the capture surfaces 35 or 246 can correspond to the photographic acquisition device of a smartphone or any other portable device including a photographic acquisition arrangement, by adding the capture device 202 of the hyperspectral scene 203 in front of the photographic acquisition device.

As a variant, the acquisition system 204 may include a compact mechanical embodiment which can be integrated into a portable and autonomous device and the detection system is included in said portable and autonomous device.

Alternatively, the capture surfaces 35 or 246 can be a device whose wavelengths captured are not in the visible part. For example, the device 202 can integrate sensors whose wavelength is between 0.001 nanometer and 10 nanometers or a sensor whose wavelength is between 10,000 nanometers and 20,000 nanometers, or a sensor whose length wave is between 300 nanometers and 2000 nanometers. It can be an infrared device.

When the image 211 of the observed hyperspectral focal plane is obtained, the detection system 2 implements a neural network 212 to detect a particular feature in the observed scene from the information of the compressed image 211.

This neural network 212 aims at determining the probability of the presence of the characteristic sought for each pixel localised at the x and y coordinates of the observed hyperspectral scene 203.

To do this, as illustrated in FIG. 11, the neural network 212 comprises an input layer 230, capable of extracting the information from the image 211 and an output layer 231, capable of processing this information so as to generate an image whose intensity of each pixel at the x and y coordinates, corresponds to the probability of the presence of the feature at the x and y coordinates of the hyperspectral scene 203.

The input layer 230 is populated from the pixels forming the compressed image. Thus, the input layer is a tensor of order three, and has two spatial dimensions of size $X_{MAX}$ and $Y_{MAX}$, and a depth dimension of size $D_{MAX}$, corresponding to the number of subsets of the compressed image copied into the input layer. The invention uses the nonlinear relation $f(x_t, y_t, d_t) \rightarrow (x_{img}, y_{img})$ defined for $x_t \in [0 \ldots X_{MAX}[$, $y_t \in [0 \ldots Y_{MAX}[$ and $d_t \in [0 \ldots D_{MAX}[$ allowing to calculate the $x_{img}$ and $y_{img}$ coordinates of the pixel of the compressed image whose intensity is copied into the tensor of order three of said input layer of the neural network at the coordinates $(x_t, y_t, d_t)$.

For example, in the case of a compressed image 211 obtained from the capture device of FIG. 8, the input layer 230 can be populated as follows:

$$f(x_t, y_t, d_t) = \begin{cases} x_{img} = x + x_{offsetX}(n) + \lambda \cdot \lambda_{sliceX} \\ y_{img} = y + y_{offsetY}(n) + \lambda \cdot \lambda_{sliceY} \end{cases}$$

with:
n=floor $(M(d_t-1)/D_{MAX})$;
n between 0 and M, the number of diffractions of the compressed image;
$\lambda = (d_t-1) \bmod (D_{MAX}/M)$;
$d_t$ between 1 and $D_{MAX}$;
$x_t$ between 0 and $X_{MAX}$;
$y_t$ between 0 and $Y_{MAX}$;
$X_{MAX}$ the size along the x axis of the tensor of order three of the input layer;
$Y_{MAX}$ the size along the y axis of the tensor of order three of the input layer;
$D_{MAX}$ the depth of the tensor of order three of the input layer;
$\lambda_{sliceX}$, the spectral step constant along the x axis of said compressed image;
$\lambda_{sliceY}$, the spectral step constant along the y axis of said compressed image;
$x_{offsetX(n)}$ corresponding to the offset along the x axis of the diffraction n;
$y_{offsetY(n)}$ corresponding to the offset along the y axis of the diffraction n.

Floor is a well-known truncation operator.

Mod represents the mathematical operator modulo.

As is clearly visible in FIG. 11, each slice, in depth, of the input tensor of order three of the neural network, receives part of a diffraction lobe corresponding substantially to a range of wavelengths.

Alternatively, the invention makes it possible to correlate the information contained in the different diffractions of the diffracted image with information contained in the non-diffracted central part of the image.

According to this variant, an additional slice can be added in the direction of the depth of the input layer, the neurons of which will be populated with the intensity detected in the pixels of the compressed image corresponding to the non-diffracted detection. For example, if we assign to this slice the coordinate $d_t=0$, we can keep the above formula for populating the input layer for $d_t$ greater than or equal to 1, and populate the layer $d_t=0$ in the following way:

$x_{img}=(Img_{width}/2)-X_{MAX}+x_t$;

$y_{img}=(Img_{height}/2)-Y_{MAX}+y_t$;

With:
$Img_{width}$ the size of the compressed image along the x axis;
$Img_{height}$ the size of the compressed image along the y axis.

The compressed image obtained by the optical system contains the focal plane of the non-diffracted scene in the center, as well as the diffracted projections along the axes of the different diffraction filters. Thus, the neural network uses, for the direct detection of the sought features, the following information of said at least one diffracted image:
the light intensity in the central and non-diffracted part of the focal plane of the scene at the x and y coordinates; and
light intensities in each of the diffractions of said compressed image whose coordinates x' and y' are dependent on the coordinates x and y of the non-diffracted central part of the focal plane of the scene.

As a variant, in the case of a compressed image 213 obtained from the capture device of FIG. 9, the input layer 230 can be populated as follows:

$f(x_t,y_t,d_t)=\{(x_{img}=x_t);(y_{img}=y_t)\}(Img=$MASK if $d_t=0$; $Img=$CASSI if $d_t>0$), With:
MASK: image of the compression mask used,
CASSI: measured compressed image,
Img: Selected image from which the pixel is copied.

On slice 0 of the tensor of order three of the input layer the image of the used compression mask is copied.

The compressed slices of the hyperspectral scene are copied from the other slices of the tensor of order three of the input layer.

The architecture of said neural network 212, 214 is composed of a set of convolutional layers assembled linearly and alternately with decimation (pooling) or interpolation (unpooling) layers.

A convolutional layer of depth d, denoted CONV (d), is defined by d convolution kernels, each of these convolution kernels being applied to the volume of the input tensor of order three and of size $x_{input}, y_{input}, d_{input}$. The convolutional layer thus generates an output volume, tensor of order three, having a depth d. An ACT activation function is applied to the calculated values of the output volume of this convolutional layer.

The parameters of each convolution kernel of a convolutional layer are specified by the learning procedure of the neural network.

Different ACT activation functions can be used. For example, this function can be a ReLu function, defined by the following equation:

ReLu$(x)=$max$(0,x)$

Alternating with the convolutional layers, decimation layers (pooling), or interpolation layers (unpooling) are inserted.

A decimation layer makes it possible to reduce the width and height of the tensor of order three at the input for each depth of said tensor of order three. For example, a MaxPool decimation layer (2,2) selects the maximum value of a sliding tile on the surface of 2×2 values. This operation is applied to all the depths of the input tensor and generates an output tensor having the same depth and a width divided by two, as well as a height divided by two.

An interpolation layer makes it possible to increase the width and the height of the tensor of order three as input for each depth of said tensor of order three. For example, a MaxUnPool(2,2) interpolation layer copies the input value of a sliding point onto the surface of 2×2 output values. This operation is applied to all the depths of the input tensor and generates an output tensor having the same depth and a width multiplied by two, as well as a height multiplied by two.

A neural network architecture allowing the direct detection of features in the hyperspectral scene can be as follows:

Input
CONV(64)
MaxPool(2,2)
CONV(64)
MaxPool(2,2)
CONV(64)
MaxPool(2,2)
CONV(64)
CONV(64)
MaxUnpool(2,2)
CONV(64)
MaxUnpool(2,2)
CONV(64)
MaxUnpool(2,2)
CONV(1)
Output As a variant, the number of convolution CONV(d) and MaxPool(2,2) decimation layers can be modified in order to facilitate the detection of features having a higher semantic complexity. For example, a higher number of convolution layers makes it possible to process more complex signatures of shape, texture, or spectral of the feature sought in the hyperspectral scene.

Alternatively, the number of deconvolution CONV (d) and MaxUnpool(2, 2) interpolation layers can be changed to facilitate reconstruction of the output layer. For example, a higher number of deconvolution layers makes it possible to reconstruct an output with greater precision.

As a variant, the CONV(64) convolution layers can have a depth different from 64 in order to deal with a number of different local features. For example, a depth of 128 allows local processing of 128 different features in a complex hyperspectral scene.

Alternatively, the MaxUnpool(2,2) interpolation layers may be of different interpolation dimensions. For example, a MaxUnpool(4, 4) layer increases the processing dimension of the top layer.

Alternatively, the ACT activation layers of the ReLu(x) type inserted following each convolution and deconvolution, may be of different type. For example, the softplus function defined by the equation: $f(x)=\log(1+e^x)$ can be used.

As a variant, the MaxPool(2,2) decimation layers can be of different decimation dimensions. For example, a MaxPool (4,4) layer makes it possible to reduce the spatial dimension more quickly and to concentrate the semantic research of the neural network on local features.

As a variant, fully connected layers can be inserted between the two central convolution layers at line 6 of the description in order to process the detection in a higher mathematical space. For example, three fully connected layers of size 128 can be inserted.

Alternatively, the dimensions of the CONV(64) convolution, MaxPool(2, 2) decimation, and MaxUnpool(2, 2) interpolation layers can be adjusted on one or more layers, in order to adapt the architecture of the neural network closest to the type of features sought in the hyperspectral scene.

Alternatively, normalization layers, for example of the BatchNorm or GroupNorm type, as described in "Batch Normalization: Accelerating Deep Network Training by Reducing Internal Covariate Shift", Sergey Ioffe, Christian Szegedy, February 2015 and "Group Normalization", Yuxin Wu, Kaiming He, FAIR, June 2018, can be inserted before or after each activation layer or at different levels of the structure of the neural network.

The weights of said neural network 212 are calculated by means of learning. For example, backward propagation of the gradient or its derivatives from training data can be used to calculate these weights.

Alternatively, the neural network 212 can determine the probability of the presence of several distinct features within the same observed scene. In this case, the last convolutional layer will have a depth corresponding to the number of distinct features to be detected. Thus the convolutional layer CONV(1) is replaced by a convolutional layer CONV(u), where u corresponds to the number of distinct features to be detected.

FIG. 12 illustrates a device 302 for capturing a hyperspectral scene 203 comprising a set of sensors making it possible to obtain at least one image compressed in two dimensions 211 or 213 and at least one standard image 312 of a hyperspectral focal plane 303 of an observed scene.

As illustrated in FIG. 13, the capture device 302 comprises at least one acquisition device, or sensor, 301 of a compressed image as described above with reference to FIG. 8.

The capture device 302 can also comprise a device for acquiring an uncompressed "standard" image, comprising a converging lens 331 and a capture surface 232. The capture device 302 can also include a device for acquiring a compressed image as described above with reference to FIG. 9.

In the presented example, the standard image acquisition device and the compressed image acquisition device are arranged juxtaposed with parallel optical axes, and optical beams at least partially overlapping. Thus, a portion of the hyperspectral scene is imaged at once by the acquisition devices. Thus, the focal planes of the various image acquisition sensors are offset from each other transversely to the optical axes of these sensors.

As a variant, a set of partially reflecting mirrors is used so as to capture said at least one non-diffracted standard image 312 and said at least one compressed image 211, 213 of the same hyperspectral scene 203 on several sensors simultaneously.

Alternatively, the sensing surface 232 can be a device whose sensed wavelengths are not in the visible part. For example, the device 202 can integrate sensors whose wavelength is between 0.001 nanometer and 10 nanometers or a sensor whose wavelength is between 10,000 nanometers and 20,000 nanometers, or a sensor whose wavelength is between 300 nanometers and 2000 nanometers.

When the images 211, 312 or 213 of the observed hyperspectral focal plane are obtained, the detection means implement a neural network 214 to detect a feature in the observed scene from the information of the compressed images 211 and 213, and the standard image 312.

As a variant, only the compressed 211 and standard 312 images are used and processed by the neural network 214.

As a variant, only the compressed 213 and standard 312 images are used and processed by the neural network 214.

Thus, when the description relates to a set of compressed images, it is at least one compressed image.

This neural network 214 aims at determining the probability of the presence of the sought feature for each pixel localised at the x and y coordinates of the observed hyperspectral scene 203.

To do this, as illustrated in FIG. 14, the neural network 214 comprises an encoder 251 for each compressed image and for each uncompressed image; each encoder 251 has an input layer 250, capable of extracting information from the image 211, 312 or 213. The neural network merges the information coming from the various encoders 251 by means of convolution layers or fully connected layers 252 (special case shown in the figure). A decoder 253 and its output layer 350, capable of processing this information so as to generate an image whose intensity at each pixel, at the x and y coordinate, corresponds to the probability of the presence of the feature at the x and y coordinates of the hyperspectral scene 203, is inserted following the fusion of the information.

As illustrated in FIG. 11, the input layer 250 of an encoder 251 is filled with the different diffractions of the compressed image 211 as described above.

The above-described filling corresponds to the filling of the first input ("Input1") of the neural network, according to the architecture presented below.

For the second input ("Input2") of the neural network, the population of the input layer relative to the "standard" image is populated by directly copying the "standard" image in the neuronal network.

According to an exemplary embodiment where a compressed image 213 is also used, the third input "Input3" of the neural network is populated as described above for the compressed image 213.

A neural network architecture allowing the direct detection of features in the hyperspectral scene can be as follows:

| Input 1 | Input 2 | Input 3 |
| --- | --- | --- |
| ⇒ CONV (64) | ⇒ CONV (64) | ⇒ CONV (64) |
| ⇒ MaxPool (2, 2) | ⇒ MaxPool (2, 2) | ⇒ MaxPool (2, 2) |
| ⇒ CONV (64) | ⇒ CONV (64) | ⇒ CONV (64) |
| ⇒ MaxPool (2, 2) | ⇒ MaxPool (2, 2) | ⇒ MaxPool (2, 2) |
| | ⇒ CONV (64) | |
| | ⇒ CONV (64) | |
| | ⇒ MaxUnpool (2, 2) | |
| | ⇒ CONV (64) | |
| | ⇒ MaxUnpool (2, 2) | |
| | ⇒ CONV (64) | |
| | ⇒ MaxUnpool (2, 2) | |
| | ⇒ CONV (1) | |
| | ⇒ Output | |

In this description, "Input1" corresponds to the portion of the input layer 250 populated from the compressed image 211. "Input2" corresponds to the portion of the input layer 250 populated from the standard image 312, and "Input3" corresponds to the portion of the input layer 250 populated from the compressed image 213. The line "CONV (64)" in the fifth line of the architecture operates information fusion.

As a variant, the line "CONV (64)" in the fifth line of the architecture operating the information fusion can be replaced by a fully connected layer having as input all of the MaxPool(2, 2) outputs of the processing paths for all of the inputs "input1", "input2" and "input3" and as output a tensor of order one serving as input to the next layer "CONV (64)" presented in the sixth line of architecture.

In particular, the fusion layer of the neural network takes into account the shifts of the focal planes of the different image acquisition sensors, and integrates the homographic function allowing the information from the different sensors to be merged taking into account the parallaxes of the different images.

The variants presented above for the embodiment of FIG. 11 can also be applied here.

The weights of said neural network 214 are calculated by means of learning. For example, backward propagation of the gradient or its derivatives from training data can be used to calculate these weights.

Alternatively, the neural network 214 can determine the probability of the presence of several distinct features within the same observed scene. In this case, the last convolutional layer will have a depth corresponding to the number of distinct features to be detected. Thus the convolutional layer CONV (1) is replaced by a convolutional layer CONV (u), where u corresponds to the number of distinct features to be detected.

According to an alternative embodiment, as shown in FIG. 11, a separate dedicated acquisition device is not necessarily used to obtain the "standard" image 312. Indeed, as presented above in connection with FIG. 9, in certain cases, part of the compressed image 211 comprises a "standard" image of the hyperspectral scene. These include the image portion C described above. In this case, this portion of image "C" of the compressed image 211 can be used as the "standard" image for input of the neural network.

Thus, the neural network 214 uses, for the direct detection of the sought features, the information of said at least one compressed image as follows:
- the light intensity in the central and non-diffracted part of the focal plane of the scene at the x and y coordinates; and
- light intensities in each of the diffractions of said compressed image whose coordinates x' and y' are dependent on the coordinates x and y of the non-diffracted central part of the focal plane of the scene.

The invention has been presented above in different variants, in which a detected feature of the hyperspectral scene is a two-dimensional image whose value of each pixel at the coordinates x and y corresponds to the probability of presence of a feature at the same x and y coordinates of the hyperspectral focal plane of the scene 203. In particular, the feature corresponds to a feature potentially indicative of the presence of a weed or a leaf symptom of deficiency or disease in this pixel. Each weed, each leaf symptom of deficiency or disease can be characterized by one or more features. The detection system then combines the results of the detection of each feature associated with a weed or a leaf symptom of deficiency or disease to determine a probability of the presence of the weed or the leaf symptom of deficiency or disease. If necessary, this process is repeated for all the predetermined weeds or foliar symptoms of deficiency or disease sought in the field. One can, however, alternatively, provide, according to the embodiments of the invention, the detection of other features. According to an example, such another feature can be obtained from the image from the neural network presented above. For this, the neural network 212, 214, can have a subsequent layer, suitable for processing the image in question and determining the sought feature. According to an example, this subsequent layer can for example count the pixels of the image in question for which the probability is greater than a certain threshold. The result obtained is then an area (possibly related to a standard area of the image). According to an example of application, if the image has, in each pixel, a probability of the presence of a chemical compound, the result obtained can then correspond to a concentration of the chemical compound in the hyperspectral image scene which can be indicative of a weed or foliar symptom of deficiency or disease.

According to another example, this subsequent layer may for example have only one neuron, the value of which (real or boolean) will indicate the presence or absence of an object or a particular feature sought in the hyperspectral scene. This neuron will have a maximum value in the event of the presence of the object or the feature and a minimum value in the opposite case. This neuron will be fully connected to the previous layer, and the connection weights will be calculated by means of learning.

According to a variant, it will be understood that the neural network can also be architectured to determine this feature without going through the determination of an image of probabilities of presence of the feature in each pixel.

In the context of this patent application, the detection system described above is considered to be a single detection system, even if it uses different sensors whose information is merged to detect a weed or deficiency or disease leaf syndrome.

In addition, each detection system 2 can comprise a localisation system, of the type comprising an inertial unit and/or a geolocalisation system.

The agricultural treatment control device further comprises a communication system connecting the deficiency or disease foliar symptoms or weeds detection systems 2. The communication system is adapted to exchange data between the deficiency or disease foliar symptoms or weeds detection systems 2 such as, in particular, data of detection of weeds or leaf symptoms of deficiencies or disease, data of localisation from inertial units, and/or geolocalisation systems.

The plurality of said at least one controllable agricultural treatment device 3 is also fixed on the agricultural machine so as to be able to treat the target plants 4. As can be seen in particular in FIG. 1, the agricultural treatment devices 3 can be arranged spaced from each other in a horizontal direction transverse to the direction of advance. They can for example be carried by a transverse beam of the agricultural machine, if necessary by the same beam which carries the detection systems 2. In addition, they can be spaced from these in the transverse direction. The agricultural treatment control device further comprises a system for localising agricultural treatment devices. The agricultural treatment control device further comprises a communication system connecting the deficiency or disease foliar symptoms or weeds detection systems 2. The agricultural treatment device also comprises a communication system suitable for exchanging data between the deficiency or disease foliar symptoms or weeds detection systems 2 and the agricultural treatment devices 3.

The number of controllable agricultural treatment devices 3 need not be the same as the number of deficiency or disease foliar symptoms or weeds detection systems 2. In fact, according to one example, the collaborative treatment decision is transmitted to the controllable agricultural treatment device 3 having the least distance from the target plant.

FIG. 15 illustrates the device, provided with two deficiency or disease foliar symptoms or weeds detection systems 2, mounted on an agricultural machine 1, in which each of the deficiency or disease foliar symptoms or weeds detection systems 2, is directed at an angle to the ground of the agricultural parcel 5, and having an overlap of their respective detection zones. In what follows, the first detection system will be characterized by the reference "0.1", and the second detection system will be characterized by the reference "0.2".

At each instant, said deficiency or disease foliar symptoms or weeds detection system 2.1 takes a photograph 6.1 of the area of agricultural field 5 facing its objective; said deficiency or disease foliar symptoms or weeds detection system 2.2, takes a picture 6.2 of the area of the agricultural field 5 facing its objective; said areas facing the optical objectives 9 of said deficiency or disease foliar symptoms or weeds detection systems 2.1 and 2.2 have a common area of acquisition.

FIG. 16 gives an example of a collaborative processing method for acquired data. The collaborative processing method is designated by the reference 8, and the steps thereof by reference signs ".indicia". As illustrated in FIG. 16, capturing 8.1 of the image information of the travelled agricultural field 5 makes it possible to obtain the acquired images 6.1 and 6.2.

Preferably, the plurality of said at least two deficiency or disease foliar symptoms or weeds detection systems 2 is composed of homogeneous systems, having the same detection properties.

The images 6.1 and 6.2 acquired respectively by said deficiency or disease foliar symptoms or weeds detection systems 2.1 and 2.2 are processed locally in each of said deficiency or disease foliar symptoms or weeds detection systems 2.1 and 2.2, in order to project each of said images acquired on the ground plane into an image projected on the ground 7.1 and 7.2. The following discussion can be applied to each detection system 2.

The projection on the ground of said image data is calculated according to the following relationships:

$$Img_{projected} = R^{-1}.Img_{acquired}$$

$$R = R_z.R_y.R_x$$

$$R_x = \begin{bmatrix} 1 & 0 & 0 \\ 0 & \cos\gamma & -\sin\gamma \\ 0 & \sin\gamma & \cos\gamma \end{bmatrix}$$

$$R_y = \begin{bmatrix} \cos\beta & 0 & \sin\beta \\ 0 & 1 & 0 \\ -\sin\beta & 0 & \cos\beta \end{bmatrix}$$

$$R_z = \begin{bmatrix} \cos\alpha & -\sin\alpha & 0 \\ \sin\alpha & \cos\alpha & 0 \\ 0 & 0 & 1 \end{bmatrix}$$

Where:
$Img_{projected}$ is the tensor containing the pixels of the image projected on the ground; and
$Img_{acquired}$ is the tensor containing the pixels of said raw image data; and
R is the matrix containing the rotations along the three roll axes, pitch and yaw; and α is the yaw angle; and
β is the roll angle; and
γ is the pitch angle.

The angles α, β, and γ, correspond respectively to the current yaw, roll and pitch angles of the deficiency or disease foliar symptoms or weeds detection system 2 considered as calculated from the raw data from the inertial unit on board the considered deficiency or disease foliar symptoms or weeds detection system 2; this roll, pitch and yaw information is calculated continuously and kept up to date by the considered deficiency or disease foliar symptoms or weeds detection system 2 by means of an attitude estimation algorithm using the raw information of said inertial unit on board the considered deficiency or disease foliar symptoms or weeds detection system 2. For example, the attitude estimation algorithm, used to calculate roll, pitch and yaw information, can be an extended Kalman filter, a Mahony or Madgwick algorithm. The document "A comparison of multisensor attitude estimation algorithm", A. Cirillo, P. Cirillo, G. De Maria, C. Natale, S. Pirozzi, in "Multisensor attitude estimation: Fundamental concepts and applications, Chapter 29, Publisher: CRC Press, Editors: H. Fourati, DEC Belkhiat, pp. 529-539, September 2016, describes and compares a set of algorithms for merging data from inertial units in order to extract the attitude, defined by the roll, pitch, and yaw angles of the system.

As illustrated in FIG. 16, the ortho-projection 8.2 of the image information acquired from the travelled agricultural field 5 makes it possible to obtain the acquired images 7.1 and 7.2 from images 6.1 and 6.2.

Said image data projected on the ground are used to detect the presence of weeds or leaf symptoms of deficiencies or diseases from the features specific to weeds or leaf symptoms of deficiencies or diseases determined by one of the methods above, in order to detect the zones, identified at the coordinates of the image $X_{detect}$ and $Y_{detect}$, in said projected image data in which the target plants 4 are present. A target plant 4 is a plant for which the detection device detects a weed or a leaf symptom of deficiency or disease. As shown in FIG. 16, each of the detections 8.3 of the presence of weeds or leaf symptoms of deficiencies or diseases is supplemented with a probability of the presence of said features specific to weeds or leaf symptoms of deficiencies or diseases. In some exemplary embodiments, this probability information is necessary for the geostatistical calculations making it possible to decide on the application of a treatment on the target plant.

As illustrated in FIG. 16, each of said detections of weeds or foliar symptoms of deficiencies or diseases is geolocalised 8.4 at lat and lng coordinates by means of the geolocalisation system on board in each of said at least two deficiency or disease foliar symptoms or weeds detection systems 2.

The calculation of geolocalisation 8.4 of a weed detection or foliar symptom of deficiency or disease is based on the following relationships:

$$\text{Distance} = \text{ratio}_{pixel2meter} \sqrt{(X_{detect} - W_{img}/2)^2 + (Y_{detect} - h_{img}/2)^2}$$

$$\text{Bearing} = \cos[(Y_{detect} - h_{img}/2)/(\text{distance}/\text{ratio}_{pixel2meter})]$$

$$\text{Rad}_{fract} = \text{distance}/\text{EARTH}_{RADIUS}$$

$$\left| lat_1 = lat \cdot \frac{\pi}{180} \right|$$
$$\left| lng_1 = lng \cdot \frac{\pi}{180} \right|$$

$$\left| lat_{21} = \sin(lat_1) \cdot \cos(\text{rad}_{fract}) \right|$$
$$\left| lat_{22} = \cos(lat_1) \cdot \sin(\text{rad}_{fract}) \cdot \cos(\text{bearing}) \right|$$

$$\left| lng_{21} = \sin(\text{bearing}) \cdot \sin(\text{rad}_{fract}) \cdot \cos(lat_1) \right|$$
$$\left| lng_{22} = \cos(\text{rad}_{fract}) - (\sin(lat_1) \cdot \sin(lat_2)) \right|$$

$$\text{Lat}_{target} (180 \cdot \text{asin}(lat_{21} + lat_{22}))/\pi$$

$$\text{Lng}_{targ\ et} = (180 \cdot (lng_1 + a\tan 2(lng_{21}, lng_{22}) + 3\pi) \mod 2\pi) - \pi))/\pi$$

Where:
EARTHRADIUS is the mean radius of the Earth, ie 6,371,000 meters; and
ratiopixel2meter is the ratio between a pixel of the image and a meter on the ground; and
$X_{detect}$ is the x coordinate, in pixels, of the detection center in the image; and
$Y_{detect}$ is the y coordinate, in pixels, of the center of detection in the image; and
$W_{img}$ is the width of the image in pixels; and
$h_{img}$ is the height of the image in pixels; and
Lat is the latitude measured by said geolocalisation system of said deficiency or disease foliar symptoms or weeds detection system 2; and
lng is the longitude measured by said geolocalisation system of said deficiency or disease foliar symptoms or weeds detection system 2; and
$lat_{target}$ is the latitude of the target plant 4 detected in the image; and
$lng_{target}$ is the longitude of the target plant 4 detected in the image.

Each of said at least two deficiency or disease foliar symptoms or weeds detection systems 2 continuously obtains the detection information geolocalised by the coordinates $lat_{target}$ and lnn target by means of the communication system between the different deficiency or disease foliar symptoms or weeds detection systems 2, from all the other deficiency or disease foliar symptoms or weeds detection systems 2. Each of said at least two deficiency or disease foliar symptoms or weeds detection systems 2 thus continuously communicates detection information geolocalised by the coordinates $lat_{target}$ and $lng_{target}$ target by means of the communication system between the different deficiency or disease foliar symptoms or weeds detection systems 2 to all the other deficiency or disease foliar symptoms or weeds detection systems 2. For example, the GeoJSON format, as described in the document RFC7946, "The GeoJSON Format", IETF August 2016, makes it possible to transport said geolocalisation detection information on said communication system.

As a variant, the ESRI Shapefile format, as described in the document ESRI Shapefile technical description, June 1998, makes it possible to transport said geolocalised detection information on said communication system.

As a variant, said latitude and longitude information can be calculated from the raw information from the inertial units of all of said at least two deficiency or disease foliar symptoms or weeds detection systems 2. Said raw information from the inertial units being exchanged by means of the communication system continuously connecting said at least two deficiency or disease foliar symptoms or weeds detection systems 2, the latitude estimation algorithm, executed on each of said at least two deficiency or disease foliar symptoms or weeds detection systems 2 can use all of the raw information. Thus, the latitude and longitude information is calculated relatively in the coordinate system of the traveled agricultural field. For example, an extended Kalman filter can be used in each of said at least two deficiency or disease foliar symptoms or weeds detection systems, by taking data from the inertial units of all of said at least two deficiency or disease foliar symptoms or weeds detection systems. In this variant, the calculation of the geolocalisation 8.4 of a detection of weed or leaf symptom of deficiency or disease is based on the same relationship with the following elements:

Lat is the latitude of said deficiency or disease foliar symptoms or weeds detection system 2 calculated in the coordinate system of the travelled agricultural field from the data coming from the inertial units of all of said at least two deficiency or disease foliar symptoms or weeds detection systems; and lng is the longitude of said deficiency or disease foliar symptoms or weeds detection system 2 calculated in the coordinate system of the travelled agricultural field from the data from the inertial units of all of said at least two deficiency or disease foliar symptoms or weeds detection systems.

As a variant, one does not necessarily use a geolocalisation of the detections of weeds or foliar symptoms of deficiencies or diseases, but to a localisation of these in an instantaneous frame of reference of the agricultural machine. Such a localisation may be sufficient, insofar as the processing can also be ordered in this frame of reference. This could be the case in particular if the detection systems and the processing systems have known relative positions over time, for example are fixed with respect to each other over time. For a deficiency or disease foliar symptoms or weeds detection system, the coordinates ($x_{target}$; $y_{target}$) of the target relative to the center of the sensor can for example be determined as follows:

$$dist_{away} = tan(sensor_{angle}) \cdot sensor_{height}$$

$$X_{target} = ratiopixel2meter \cdot (X_{detect} - w_{img}/2)$$

$$Y_{target} = dist_{away} + ratiopixel2meter \cdot (Y_{detect} - h_{img}/2)$$

Where:
$sensor_{angle}$ is the angle between the vertical and the average viewing angle of the deficiency or disease foliar symptoms or weeds detection system 2;
sensorheight is the height on the ground of the deficiency or disease foliar symptoms or weeds detection system 2;
ratiopixel2meter is the ratio between a pixel in the image and a meter on the ground;
$X_{detect}$ is the x coordinate, in pixels, of the center of detection in the image;
$Y_{detect}$ is the y coordinate, in pixels, of the center of detection in the image;
$w_{img}$ is the width of the image in pixels;
him is the height of the image in pixels;
$X_{target}$ is the relative longitudinal coordinate in meters of the target plant 4 detected in the image;
$Y_{target}$ is the relative coordinate in meters facing said deficiency or disease foliar symptoms or weeds detection system 2 of the target plant 4 detected in the image.

All of the information on said detections of weeds or leaf symptoms of deficiencies or diseases from all of said at least two deficiency or disease foliar symptoms or weeds detection systems 2 is stored in a geographic database local to each of said at least two deficiency or disease foliar symptoms or weeds detection systems.

Each of said at least two deficiency or disease foliar symptoms or weeds detection systems 2 having its detection zone of the sought-after features; weeds or leaf symptoms of deficiencies or diseases; in agricultural field 5, overlapping with said at least two neighbor deficiency or disease foliar symptoms or weeds detection systems 2, lateral overlapping of said information for detection of weeds or foliar symptoms of deficiencies or diseases is obtained.

Likewise, each of said at least two deficiency or disease foliar symptoms or weeds detection systems 2 detecting at the present time the sought features of weeds or leaf symptoms of deficiencies or diseases in the agricultural field 5 in the detection zone within reach of the optical objective of said deficiency or disease foliar symptoms or weeds detection system 2, a temporal recovery of said information of detections of weeds or leaf symptoms of deficiencies or disease is obtained. By temporal overlap, reference is made to the fact that the detection zones in two successive distinct instants overlap if the frequency of determination is sufficiently high. FIG. 17 illustrates this embodiment, and represents in dotted lines the optical field acquired by the deficiency or disease foliar symptoms or weeds detection system 2 at a first instant t1, and in dashed lines the optical field acquired by the same deficiency or disease foliar symptoms or weeds detection system 2 at a second instant t2. The optical fields are shifted geographically due to the movement of the agricultural machine during the time interval. The snapshot and image obtained at the second instant are represented with the index "0.3". However, at all times, detections are geolocalised in a common frame of reference.

Thus, said information for detecting weeds or leaf symptoms of deficiencies or diseases stored in said geographic database local to each of said at least two deficiency or disease foliar symptoms or weeds detection systems 2 contains the redundancies of said information of detections of weeds or foliar symptoms of deficiencies or diseases. Operation 8.5 of the merger can be a krigeage operation, as described in the book "Lognormal-de VVijsian Geostatistics for Ore Evaluation", DG Krige, 1981, ISBN 978-0620030069, taking into account all of said geolocalised detection information of weeds or leaf symptoms of deficiencies or diseases and containing the probability of detection information, coming from the plurality of said at least two deficiency or disease foliar symptoms or weeds detection systems 2, as well as the lateral and temporal overlap information, thus confirming the probabilities of detection of weeds or leaf symptoms of deficiencies or diseases. Thus, at a given detection point, the result is determined from the detection result obtained for this point by each of the detection systems. The result makes it possible to decide whether or not to treat this point. For example, we compare the result with a certain predetermined threshold and, if the result is positive, we order the application of the treatment.

The merger in question takes into account the quality of the detection. For example, when the merged detections include maps of the probability of the presence of a weed or a leaf symptom of deficiency or disease, the result of the fusion may include a map of the probability of the presence of the weed or leaf symptom of deficiency or disease obtained from these individual maps. Therefore, intrinsically, each individual map carries information about the quality of the detection, and the merged result takes this quality into account. For example, if, at a given location, a detection system determines a probability of the presence of a leaf symptom of a certain disease at 90%, and another detection system determines a probability of the presence of a leaf symptom of this same disease at 30%, the quality of detection of at least one of the two detection systems is poor, and the final result transcribes this quality of detection.

According to a variant, during this fusion, the distance of each detection is also taken into account. Indeed, if at a given location, being close to the optical axis of a detection system, determines a probability of the presence of a leaf symptom of a certain disease at 30%, and another detection system, for which this same place is distant from the optical axis, determines a 90% probability of the presence of a leaf symptom of the same disease, we will apply a greater weight to the detection system facing the studied localisation during fusion.

As a variant, operation 8.5 of fusion is an operation taking into account all of the geolocalised information on the detection of weeds or leaf symptoms of deficiencies or diseases and containing the information on the probability of detection, from the plurality of said at least two deficiency or disease foliar symptoms or weeds detection systems 2, as well as the information on lateral and temporal overlaps, in order to calculate the consolidated probabilities of geolocalised detections of weeds or foliar symptoms deficiencies or diseases; Said consolidation operation taking into account the probabilities of each geolocalised detection of weeds or leaf symptoms of deficiencies or diseases.

In the variant of FIG. 17, the localised detection information obtained for several spaced moments is merged as described above. This embodiment is, if applicable, applicable to a single deficiency or disease foliar symptoms or weeds detection system. In this case, the collaborative work is done from two detections spaced in time from the same deficiency or disease foliar symptoms or weeds detection system. If the agricultural treatment control device includes a single detection of weed or foliar symptom of deficiency or disease, it does not implement a communication system between deficiency or disease foliar symptoms or weeds detection systems. However, a communication system between the deficiency or disease foliar symptoms or weeds detection system and the treatment device remains necessary.

Each of said at least two deficiency or disease foliar symptoms or weeds detection systems continuously calculates the instantaneous speed of movement by means of said localisation information obtained by means of said localisation system. The speed information is necessary in order to estimate the order of time of said at least one agricultural processing device and to anticipate the processing time as a function of said agricultural processing device.

Thus, depending on the nature and detected localisation of weeds or leaf symptoms of deficiencies or diseases, the nature and localisation of the treatment devices, and the speed of movement, the control device determines the processing device(s) to be actuated, and the temporal characteristics (instant, duration, etc.) of this actuation.

With regard to the calculation of the command 8.6 to be sent to said at least one agricultural treatment device 3, each of said at least two deficiency or disease foliar symptoms or weeds detection systems 2 estimates at each instant and for each of said target plants 4 currently in range of said at least one treatment device 3, which of said at least one treatment device 3 is the most suitable for treating said target plant 4.

The control commands are transmitted to said at least one agricultural treatment device by means of communication between said at least two deficiency or disease foliar symptoms or weeds detection systems and said at least one agricultural treatment device.

With regard to controlling said at least one agricultural treatment device, all of the information from said detections of weeds or leaf symptoms of deficiencies or diseases are geolocalised, agricultural treatment devices are also geolocalised, and said at least one agricultural treatment device are actuated at the exact moment when said at least one agricultural treatment device is above the target plants.

For example, when said at least one agricultural treatment device 3 is a spreading nozzle, the command 8.7 to be sent to each of said at least one agricultural treatment device 3 is a pressure and flow control taking into account the presence of a target plant at the instant present in the spraying zone of said spreading nozzle.

As a variant, when said at least one agricultural processing device 3 is a LASER, the command 8.7 to be sent to each of said at least one agricultural processing device 3 is a command for transverse and longitudinal shifts, and for lighting power taking into account the presence of a target plant at the instant present in the range of said LASER.

As a variant, when said at least one agricultural treatment device 3 is a high pressure water jet, the command 8.7 to be sent to each of said at least one agricultural treatment device 3 is a pressure and flow control taking into account the presence of a target plant at the instant present in the range area of the high pressure water injection nozzle.

As a variant, when said at least one agricultural treatment device 3 is a mechanical hoeing weeding tool, the command 8.7 to be sent to each of said at least one agricultural treatment device 3 is an activation command taking into account the presence of a target plant at the instant present in the area of said mechanical hoeing weedkiller.

As a variant, when said at least one agricultural treatment device 3 is an electric weed control tool, the command 8.7 to be sent to each of said at least one agricultural treatment device 3 is an activation command taking into account the presence of a target plant at the instant present in the area of said electric weeding tool.

In the presentation above, the acquired image is first projected in a given frame of reference, then the detection of weed or foliar symptom of deficiency or disease is implemented for the projected image. Alternatively, one could plan to start by making an image of the probability of the presence of a weed or foliar symptom of deficiency or detection from the raw acquired image, then to project it in the given frame of reference.

In the presentation above, the geolocalisation of each detection system is carried out independently, and the geolocalisation detections are merged so as to decide on the possible treatment. In variants, as described below, the geolocalisation of each detection system can be done collaboratively.

In a first variant, said attitude information can be calculated from the raw information from the inertial units of all of said at least two deficiency or disease foliar symptoms or weeds detection systems 2. Said raw information from inertial units being exchanged by means of the communication system continuously connecting said at least two deficiency or disease foliar symptoms or weeds detection systems 2, the attitude estimation algorithm executed on each of said at least two deficiency or disease foliar symptoms or weeds detection systems 2 can use all of the raw information. Thus, the estimates of roll, pitch and yaw are consolidated by a set of similar, consistent and covariant measures. For example, an extended Kalman filter can be used in each of said at least two deficiency or disease foliar symptoms or weeds detection systems, by taking data from the inertial units of all of said at least two deficiency or disease foliar symptoms or weeds detection systems. The document "Data Fusion Algorithms for Multiple Inertial Measurement Units", Jared B. Bancroft and Gerard Lachapelle, Sensors (Basel), Jun. 29, 2011, 6771-6798 presents an alternative algorithm for merging raw data from a set of inertial units to determine attitude information.

In a second variant, said attitude information can be calculated from the raw information of the inertial units to which the geolocalisation data of all of said at least two deficiency or disease foliar symptoms or weeds detection systems 2 are added. Said raw information from the inertial units as well as the geolocalisation data being exchanged by means of the communication system connecting the said at least two deficiency or disease foliar symptoms or weeds detection systems 2, the attitude estimation algorithm can use all of the raw information. For example, an extended Kalman filter can be used in each of said at least two deficiency or disease foliar symptoms or weeds detection systems, taking the data from inertial units as well as the geolocalisation data from the set of said at least two deficiency or disease foliar symptoms or weeds detection systems 2. Furthermore, a method, as described in the document "Attitude estimation for accelerated vehicles using GPS/INS measurements", Minh-Duc Hua, July 2010, Control Engineering Practice Volume 18, Issue 7, July 2010, pages 723-732, allows a fusion of information from a geolocalisation system and an inertial unit.

For example, said communication system between said at least two deficiency or disease foliar symptoms or weeds detection systems 2 and said at least one agricultural treatment device 3 is a wired Ethernet 1 Gigabit network per second thus allowing each of said at least two deficiency or disease foliar symptoms or weeds detection systems 2 to communicate with the other deficiency or disease foliar symptoms or weeds detection systems 2 as well as with said at least one agricultural treatment device 3.

With regard to the mapping of the agricultural field 5 travelled by said agricultural machine, each of said at least two deficiency or disease foliar symptoms or weeds detection systems 2 locally build a mapping of the specific features; or the presence of weeds or leaf symptoms of deficiencies or diseases; using a local geographic database. The geolocalised detection information of the presence of weeds or leaf symptoms of deficiencies or diseases, detected by all of said at least two deficiency or disease foliar symptoms or weeds detection systems and exchanged by means of the system of communication, are thus stored in each of said at least two deficiency or disease foliar symptoms or weeds detection systems 2.

Thus, the content of each of said geographic databases locally stored in each of said at least two deficiency or disease foliar symptoms or weeds detection systems 2, represents the real state, as measured by all of said at least two deficiency or disease foliar symptoms or weeds detection systems 2, and sanitary state of said traveled agricultural field 5.

As a variant, the mapping information of the agricultural field 5 travelled by said agricultural machine, is transmitted by means of a communication system, and displayed on a control screen intended for the technician carrying out the processing of the agricultural field 5.

Preferably, the communication system used to transmit the mapping information of the agricultural field 5 to said control screen intended for the technician carrying out the treatment of the agricultural field 5, comprises a wired Gigabit Ethernet network.

Alternatively, the communication system used to transmit the mapping information of the agricultural field 5 to said control screen intended for the technician processing the agricultural field 5, is a wired CAN network ("Control Area Network").

The cartography of agricultural field 5 finds an advantageous use in order to produce statistics of sprays or treatments applied to said agricultural field 5. Said statistics also make it possible to measure the prevalence, the presence and the quantity of certain species of weeds, as well as their densities and stages. The prevalence, presence and density of leaf symptoms of deficiencies or diseases can also be calculated from the information contained in the mapping of the agricultural field 5.

In the example presented, each detection system communicates with neighboring detection systems, for decision making for collaborative processing. As a variant, it is possible to provide a central processor suitable for communicating, via the communication system, with the detection systems, making a decision, and communicating the processing instructions to the processing devices 3 via the communication system.

According to the invention, it is sufficient for a single deficiency or disease foliar symptoms or weeds detection system 2 to make a collaborative decision using information relating to other deficiency or disease foliar symptoms or weeds detection systems.

The methods which are described can be computerized methods. They can then be defined in computer programs, which can be executed by one or more processors of programmable machines.

REFERENCES agricultural machine 1
deficiency or disease leaf symptoms or weeds detection systems 2
detection systems 2.1 and 2.2
agricultural treatment device 3
target plant 4
agricultural field 5
photo 6.1, 6.2
acquired images 7.1 and 7.2 from images 6.1 and 6.2
capture 8.1
ortho-projection 8.2
detections 8.3
geolocalisation calculation 8.4
merger operation 8.5
command 8.6
command 8.7
optical lens 9
capture device 10
first sensor 11
second sensor 12
third sensor 13
diffracted image 14, 14'
hyperspectral image 15
building module 16
non-diffracted image 17'
infrared image 18'
neural network 20
characterization module 21
isolate 25
extract 26 first converging lens 30
opening 31
collimator 32
diffraction grating 33
second converging lens 34
capture area 35
input layer 40
output layer 41
capture device 202
Hyperspectral scene 203
sensor, or acquisition system 204,
two-dimensional compressed image 211
neural network 212
compressed image 213
neural network 214
input layer 230
output layer 231
sensing surface 232
first converging lens 241
mask 242
collimator 243
prism 244
second converging lens 245
capture surface 246
entry layer 250
encoder 251
convolutional layers or fully connected layers 252
decoder 253
acquisition device, or sensor, 301
capture device 302
focal plane 303
standard image 312
converging lens 331
output layer 350

The invention claimed is:

1. A system comprising an agricultural treatment control device and a controllable agricultural treatment device of an agricultural machine, in which said controllable agricultural treatment device comprises at least one spray nozzle, a flow or a pressure of said at least one spray nozzle being controlled by a collaborative decision of all of said plurality of deficiency or disease foliar symptoms or weeds detection systems,
wherein said agricultural treatment control device comprises:
a plurality of deficiency or disease foliar symptoms or weeds detection systems, wherein each of said plurality of deficiency or disease foliar symptoms or weeds detection systems provides an individual map of probability of presence of deficiency or disease foliar symptom or weeds, carrying quality of detection information, and is attachable to said agricultural machine;
wherein a first deficiency or disease foliar symptoms or weeds detection system with a first detection zone is adapted to collaborate with a second deficiency or disease foliar symptoms or weeds detection system with a second detection zone in order to collaboratively decide on a treatment to be applied to said first detection zone by a fusion of said individual maps;
wherein said fusion is weighted according to each of said quality of detection information;
wherein said first detection zone and said second detection zone partially overlap each other;
a localization system of said plurality of deficiency or disease foliar symptoms or weeds detection systems;
a communication system between said plurality of deficiency or disease foliar symptoms or weeds detection systems and said at least one controllable treatment device.

2. An agricultural treatment control device according to claim 1, further comprising a computer with a computer program, wherein said computer program is run on said computer in order to make said decision on said treatment and communicate with said at least one controllable treatment device.

3. An agricultural treatment control device according to claim 1, wherein said first detection zone partially laterally overlaps with said second detection zone.

4. An agricultural treatment control device according to claim 1, wherein said first detection zone temporally overlaps with said second detection zone.

5. An agricultural treatment control device according to claim 1, wherein all of said plurality of deficiency or disease foliar symptoms or weeds detection systems are adapted to collaboratively build a mapping of an agricultural field travelled by said agricultural machine, wherein a cartography is constructed by a geostatistical process with a localized detection data representing a real state as measured by said plurality of deficiency or disease foliar symptoms or weeds detection systems.

6. An agricultural treatment control device according to claim 5, further comprising a control screen, on which a map of said travelled agricultural field is displayed.

7. A system comprising an agricultural treatment control device according to claim 5, and further comprising a processor adapted to produce statistics on spraying, prevalence, species, densities, or stages of weeds or foliar symptoms of deficiencies or diseases present in the agricultural field using the mapping of the travelled agricultural field.

8. A system according to claim 7, in which a controllable agricultural treatment device is localized.

9. An agricultural treatment control device according to claim 1, in which the localization system comprises a geolocalization system and/or an inertial unit.

10. An agricultural treatment control device according to claim 1, which further comprises at least one of the following features:
at least one of said plurality of deficiency or disease foliar symptoms or weeds detection systems comprises a hyperspectral sensor;
at least one of said plurality of deficiency or disease foliar symptoms or weeds detection systems is adapted to detect a presence of weeds or foliar symptoms of deficiencies or diseases from peculiarities specific to weeds or foliar symptoms of deficiencies or diseases;
at least one of said plurality of deficiency or disease foliar symptoms or weeds detection systems is adapted to detect an area for a weed or foliar symptom of deficiency or disease;
at least one of said plurality of deficiency or disease foliar symptoms or weeds detection systems is supplemented with a probability of the presence of said peculiarities specific to weeds or foliar symptoms of deficiencies or diseases;
the localization system is adapted to localize the treatment to be applied to the detection zone;
a second communication system between said plurality of deficiency or disease foliar symptoms or weeds detection systems.

11. An agricultural treatment control device according to claim 1, in which at least one of said plurality of deficiency or disease foliar symptoms or weeds detection systems comprises a system for direct detection of features in the hyperspectral scene integrating a deep and convolutional neural network designed to detect at least one characteristic sought in said hyperspectral scene for a weed or a leaf symptom of deficiency or disease from at least one compressed image of the hyperspectral scene.

12. An agricultural treatment control device according to claim 1, in which at least one of said plurality of deficiency or disease foliar symptoms or weeds detection systems comprises a system for detecting features in the hyperspectral scene comprising:
- a neural network configured to calculate a hyperspectral hypercube of the hyperspectral scene from at least one compressed image and an uncompressed image of the hyperspectral scene,
- a characterization module to detect the weed or the leaf symptom of deficiency or disease from the hyperspectral hypercube.

13. A system comprising an agricultural treatment control device and a controllable agricultural treatment device of an agricultural machine, in which said controllable agricultural treatment device comprises at least one LASER for destroying weeds, said at least one LASER being controlled by a collaborative decision of all of said plurality of deficiency or disease foliar symptoms or weeds systems,
wherein said agricultural treatment control device comprises:
- a plurality of deficiency or disease foliar symptoms or weeds detection systems, wherein each of said plurality of deficiency or disease foliar symptoms or weeds detection systems provides an individual map of probability of presence of deficiency or disease foliar symptom or weeds, carrying quality of detection information, and is attachable to said agricultural machine;
- wherein a first deficiency or disease foliar symptoms or weeds detection system with a first detection zone is adapted to collaborate with a second deficiency or disease foliar symptoms or weeds detection system with a second detection zone in order to collaboratively decide on a treatment to be applied to said first detection zone by a fusion of said individual maps;
- wherein said fusion is weighted according to each of said quality of detection information;
- wherein said first detection zone and said second detection zone partially overlap each other:
- a localization system of said plurality of deficiency or disease foliar symptoms or weeds detection systems;
- a communication system between said plurality of deficiency or disease foliar symptoms or weeds detection systems and said at least one controllable treatment device.

14. A system comprising an agricultural treatment control device and a controllable agricultural treatment device of an agricultural machine, in which said controllable agricultural treatment device comprises at least one high pressure water jet whose objective is the destruction of weeds, said at least one high pressure water jet being controlled by a collaborative decision of all of said plurality of deficiency or disease foliar symptoms or weeds detection systems,
wherein said agricultural treatment control device comprises:
- a plurality of deficiency or disease foliar symptoms or weeds detection systems, wherein each of said plurality of deficiency or disease foliar symptoms or weeds detection systems provides an individual map of probability of presence of deficiency or disease foliar symptom or weeds, carrying quality of detection information, and is attachable to said agricultural machine;
- wherein a first deficiency or disease foliar symptoms or weeds detection system with a first detection zone is adapted to collaborate with a second deficiency or disease foliar symptoms or weeds detection system with a second detection zone in order to collaboratively decide on a treatment to be applied to said first detection zone by a fusion of said individual maps;
- wherein said fusion is weighted according to each of said quality of detection information;
- wherein said first detection zone and said second detection zone partially overlap each other;
- a localization system of said plurality of deficiency or disease foliar symptoms or weeds detection systems;
- a communication system between said plurality of deficiency or disease foliar symptoms or weeds detection systems and said at least one controllable treatment device.

15. A system comprising an agricultural treatment control device and a controllable agricultural treatment device of an agricultural machine, in which said controllable agricultural treatment device comprises at least one mechanical hoeing weed control tool, said at least one mechanical hoeing weed control tool being controlled by a collaborative decision of all of said plurality of deficiency or disease foliar symptoms or weeds detection systems,
wherein said agricultural treatment control device comprises:
- a plurality of deficiency or disease foliar symptoms or weeds detection systems, wherein each of said plurality of deficiency or disease foliar symptoms or weeds detection systems provides an individual map of probability of presence of deficiency or disease foliar symptom or weeds, carrying quality of detection information, and is attachable to said agricultural machine;
- wherein a first deficiency or disease foliar symptoms or weeds detection system with a first detection zone is adapted to collaborate with a second deficiency or disease foliar symptoms or weeds detection system with a second detection zone in order to collaboratively decide on a treatment to be applied to said first detection zone by a fusion of said individual maps;
- wherein said fusion is weighted according to each of said quality of detection information;
- wherein said first detection zone and said second detection zone partially overlap each other:
- a localization system of said plurality of deficiency or disease foliar symptoms or weeds detection systems;
- a communication system between said plurality of deficiency or disease foliar symptoms or weeds detection systems and said at least one controllable treatment device.

16. A system comprising an agricultural treatment control device and a controllable agricultural treatment device of an agricultural machine, in which said controllable agricultural treatment device comprises at least one electric weed control tool for destroying weeds, said at least one electric weed control tool being controlled by a collaborative decision of all of said plurality of deficiency or disease foliar symptoms or weeds detection systems,
wherein said agricultural treatment control device comprises:
- a plurality of deficiency or disease foliar symptoms or weeds detection systems, wherein each of said plurality of deficiency or disease foliar symptoms or weeds detection systems provides an individual map of probability of presence of deficiency or disease foliar symptom or weeds, carrying quality of detection information, and is attachable to said agricultural machine;

wherein a first deficiency or disease foliar symptoms or weeds detection system with a first detection zone is adapted to collaborate with a second deficiency or disease foliar symptoms or weeds detection system with a second detection zone in order to collaboratively decide on a treatment to be applied to said first detection zone by a fusion of said individual maps;

wherein said fusion is weighted according to each of said quality of detection information;

wherein said first detection zone and said second detection zone partially overlap each other;

a localization system of said plurality of deficiency or disease foliar symptoms or weeds detection systems;

a communication system between said plurality of deficiency or disease foliar symptoms or weeds detection systems and said at least one controllable treatment device.

17. A method for collaborative control of agricultural treatment to be applied on an agricultural machine, said agricultural machine comprising at least one controllable treatment device, wherein the agricultural treatment control method comprises:

a collaborative decision of a first deficiency or disease foliar symptoms or weeds detection system adapted to provide an individual map of a probability of presence of deficiency or disease foliar symptom or weeds, carrying a first quality of detection information and a second deficiency or disease foliar symptoms or weeds detection system adapted to provide another individual map of a probability of presence of deficiency or disease foliar symptom or weeds, carrying a second quality of detection information, of which the detection zones partially overlap, each being suitable for attachment to the agricultural machine and the localization of the treatment to be applied to the detection area by fusing said individual maps, the fusion being weighted according to each of said quality of detection information; and a communication between said first deficiency or disease foliar symptoms or weeds detection systems with said at least one treatment device, wherein for each of at least two deficiency or disease foliar symptoms or weeds detection systems, said collaborative piloting method comprises the steps of:

Acquisition of a new image datum from the ground of the travelled agricultural field on which an agricultural machine moves by means of said deficiency or disease foliar symptoms or weeds detection system; and Acquisition of additional position information from said deficiency or disease foliar symptoms or weeds detection system by means of the localization system; and Projection of said image data acquired by each of said deficiency or disease foliar symptoms or weeds detection systems on the ground plane; and Detection of the presence of weeds or foliar symptoms of deficiencies or diseases from said image data acquired and projected onto said ground plane; and Calculation of the positions of weeds or leaf symptoms of deficiencies or diseases in the detection zone of said deficiency or disease foliar symptoms or weeds detection system; said position calculation using the localization information of said localization system of said deficiency or disease foliar symptoms or weeds detection system and the detection information in said image data; and Communication of said positions of weeds or leaf symptoms of deficiencies or diseases in the detection zone of said deficiency or disease foliar symptoms or weeds detection system to all of the other deficiency or disease foliar symptoms or weeds detection systems; and Reception of said positions of weeds or foliar symptoms of deficiencies or diseases in the detection area of said deficiency or disease foliar symptoms or weeds detector from other deficiency or disease foliar symptoms or weeds detection systems; and Calculation of the command to be sent to the treatment device concerned by the detection zone of said deficiency or disease foliar symptoms or weeds detection system; and Issuance of the command to the treatment device concerned by the detection zone of said deficiency or disease foliar symptoms or weeds detection system.

18. A collaborative piloting method according to claim 17, further comprising at least one of the following features:

said projection uses information from said inertial unit of said deficiency or disease foliar symptoms or weeds detection system in order to determine the angle of capture of the image data relative to the normal vector on the ground;

Communication of said positions of weeds or foliar symptoms of deficiencies or diseases in the detection zone of said deficiency or disease foliar symptoms or weeds detection system to others, in particular to all the other deficiency or disease foliar symptoms or weeds detection systems;

the fusion is also weighted according to the calculated distance of each detection.

* * * * *